(12) United States Patent
Matsuzawa

(10) Patent No.: US 11,048,988 B2
(45) Date of Patent: Jun. 29, 2021

(54) LEARNING DEVICE, PRINT CONTROL DEVICE, AND LEARNED MODEL

(71) Applicant: SEIKO EPSON CORPORATION, Tokyo (JP)

(72) Inventor: Tomoki Matsuzawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/714,924

(22) Filed: Dec. 16, 2019

(65) Prior Publication Data
US 2020/0193249 A1    Jun. 18, 2020

(30) Foreign Application Priority Data

Dec. 18, 2018    (JP) .............................. JP2018-236084

(51) Int. Cl.
G06K 15/02    (2006.01)
G06N 3/08    (2006.01)
G06N 3/04    (2006.01)
G06K 15/00    (2006.01)
H04N 1/00    (2006.01)
H04N 1/60    (2006.01)

(52) U.S. Cl.
CPC ....... *G06K 15/1872* (2013.01); *G06K 15/002* (2013.01); *G06K 15/1878* (2013.01); *G06K 15/1882* (2013.01); *G06N 3/04* (2013.01); *G06N 3/08* (2013.01); *H04N 1/00015* (2013.01); *H04N 1/00023* (2013.01); *H04N 1/00031* (2013.01); *H04N 1/00045* (2013.01); *H04N 1/00082* (2013.01); *H04N 1/00442* (2013.01); *H04N 1/6027* (2013.01); *H04N 1/6038* (2013.01)

(58) Field of Classification Search
CPC ...... H04N 1/00002–00092; H04N 1/40–4097; H04N 1/46–628; G06K 15/1835–1846; G06K 15/1867–1885
See application file for complete search history.

(56) References Cited

U.S. PATENT DOCUMENTS

| | | | | | |
|---|---|---|---|---|---|
| 5,164,837 | A | * | 11/1992 | Hirosawa | H04N 1/40 358/296 |
| 5,200,816 | A | * | 4/1993 | Rose | H04N 1/6019 358/518 |
| 5,386,496 | A | * | 1/1995 | Arai | G01J 3/46 706/17 |
| 5,687,250 | A | * | 11/1997 | Curley | G06K 9/036 382/112 |
| 5,748,329 | A | * | 5/1998 | Chang | H04N 1/6033 358/504 |

(Continued)

FOREIGN PATENT DOCUMENTS

JP    2001-186323 A    7/2001

*Primary Examiner* — Scott A Rogers
(74) *Attorney, Agent, or Firm* — Global IP Counselors, LLP

(57) ABSTRACT

A learning device includes an acquiring unit and a learning unit. The acquiring unit acquires an image and correction information designated for printing the image. The learning unit performs machine learning on recommended correction information that indicates correction content recommended for the print target image in printing the print target image, based on the data set in which the image is associated with the correction information.

12 Claims, 12 Drawing Sheets

(56) References Cited

U.S. PATENT DOCUMENTS

| | | | | |
|---|---|---|---|---|
| 5,929,906 | A * | 7/1999 | Arai | H04N 1/6086 |
| | | | | 348/157 |
| 6,480,299 | B1 * | 11/2002 | Drakopoulos | H04N 1/6033 |
| | | | | 358/1.1 |
| 10,379,801 | B1 * | 8/2019 | Waller | G06F 3/1285 |
| 10,679,328 | B2 * | 6/2020 | Nanda | G06T 5/40 |
| 2001/0005222 | A1 | 6/2001 | Yamaguchi | |
| 2008/0204832 | A1 * | 8/2008 | Haikin | H04N 1/60 |
| | | | | 358/518 |
| 2015/0098646 | A1 * | 4/2015 | Paris | G06K 9/6202 |
| | | | | 382/159 |
| 2019/0172228 | A1 * | 6/2019 | Steenhoek | G01J 3/463 |
| 2019/0213719 | A1 * | 7/2019 | Hiasa | G06T 5/009 |
| 2020/0192609 | A1 * | 6/2020 | Shinkai | G06F 3/1254 |
| 2020/0344411 | A1 * | 10/2020 | Cragg | H04N 5/23218 |

\* cited by examiner

LEARNING DEVICE, PRINT CONTROL DEVICE, AND LEARNED MODEL

The present application is based on, and claims priority from JP Application Serial Number 2018-236084, filed Dec. 18, 2018, the disclosure of which is hereby incorporated by reference herein in its entirety.

BACKGROUND

1. Technical Field

The present disclosure relates to a learning device, a print control device, a learned model, and the like.

2. Related Art

In the related art, a method for performing correction processing on image data when printing predetermined image data is widely known. For example, JP-A-2001-186323 discloses a method for automatically correcting image data including a person image so as to be appropriate for a photograph for identification.

In the method of the related art, the man-hours required for setting parameters for appropriately performing the automatic correction are enormous. For example, the method disclosed in JP-A-2001-186323 prepares a target value for skin color correction in advance and calculates a skin color correction value based on the target value. In the method of JP-A-2001-186323, the burden of setting a target value and the like for calculating an appropriate color correction value is extremely large.

SUMMARY

An aspect of the present disclosure relates to a learning device including: an acquiring unit that acquires an image and correction information designated for printing the image; and a learning unit that performs machine learning on recommended correction information recommended for correction on a print target image, based on a data set in which the image is associated with the correction information.

DESCRIPTION OF EXEMPLARY EMBODIMENTS

Figure 1:
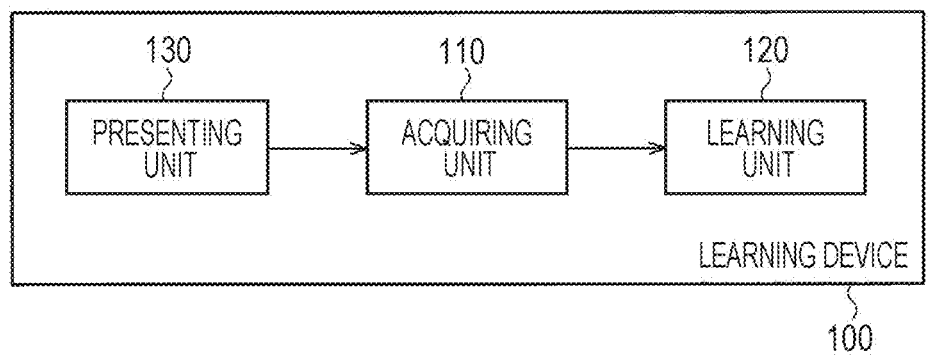
FIG. 1 illustrates a configuration example of a learning device.

Hereinafter, an embodiment will be described. In addition, the embodiment which will be described below does not inappropriately limit the contents described in the claims. Further, not all of the configurations which will be described in the embodiment are necessarily essential components of the disclosure.

1. Overview

In the related art, in image printing, correction processing using correction information is performed with respect to the image. The correction processing is performed by a print application, such as a printer driver. The correction information here is information for correcting a given image into a mode suitable for printing. Specifically, the correction information is a set of parameters that designates a degree of change in image visibility. For example, the correction information includes information that indicates the color density. The color density is the density of each color that corresponds to the color of ink or toner used in a printing apparatus. For example, when the printing apparatus includes inks of three colors, such as cyan, magenta, and yellow, the information that indicates the color density is numerical data that indicates each color density of cyan, magenta, and yellow, and may be a value which is the color density itself or may be information that can perform an arithmetic operation regarding the color density. By adjusting the color density based on the correction information, it becomes possible to appropriately adjust the color tone in the printing result. The correction information is not limited to the color density, and may include information that indicates brightness and information that indicates contrast. The information that indicates the brightness may be a brightness value itself or information for performing an arithmetic operation regarding the brightness. The same applies to the information that indicates contrast. Further, the correction information is not prevented from including other information for adjusting the image, and for example, information that indicates saturation and the like can be added.

In the method of the related art, the correction information needs to be set manually by a user, for example. For example, the user sets, as the correction information, five numerical values that respectively indicate cyan density, magenta density, yellow density, brightness, and contrast.

By performing the correction processing based on the correction information, it becomes possible to print the print target image in a desired manner.

However, it is not easy for the user to grasp what value the correction information is set to obtain the desired color, vividness, and the like of the image. Therefore, manual correction information setting places a heavy burden on the user. In addition, the images include different types of images, such as person images and landscape images. The landscape images can also be broadly classified into natural objects and artifacts, and further, among natural objects, mountains, mountain streams, sunset scenes, and the like can be subdivided. A method of manually setting the correction information for performing desired correction processing for each of such various images places a large burden on the user.

In the related art, there is known a method in which several correction modes, such as a portrait mode, a landscape mode, and a night view mode, are prepared in advance. Each correction mode is associated with the correction information set to a given value in advance. Therefore, the user can adjust the correction information by selecting the correction mode without setting a specific value.

However, in the method of the related art in which the correction mode is used, a correction information pattern is limited to the number of correction modes, and thus, flexible adjustment is difficult. Further, it is necessary for the user to perform the correction mode selection manually. In addition, the association between the correction mode and the correction information is fixed, and it is difficult to reflect the preference for each user.

Accordingly, in the embodiment, machine learning is performed with respect to conditions for the correction information recommended for printing a print target image. Hereinafter, the recommended correction information is referred to as recommended correction information. In the learning processing, a data set in which the image is associated with the correction information is required, and thus, it is assumed that input by the user is required to some extent. However, when the learning result is acquired, it becomes possible to automatically present the correction information suitable for the correction processing of the print target image based on the learning result. Further, by making the data used for learning user-specific data, it is also possible to acquire the learning result that reflect the preference for each user.

Hereinafter, learning processing and inference processing according to the embodiment will be described respectively. The learning processing is processing for acquiring the learning result by performing the machine learning based on training data. The learning result is specifically a learned model. The inference processing is processing for outputting some inference result based on the input by using the learned model generated by the learning processing. In addition, a method for updating the learned model based on the result of inference processing will also be described.

2. Learning Processing 2.1 Configuration Example of Learning Device

FIG. 1 is a view illustrating a configuration example of a learning device 100 according to the embodiment. The learning device 100 includes an acquiring unit 110 that acquires training data used for learning, a learning unit 120 that performs the machine learning based on the training data, and a presenting unit 130 that presents the user with various information.

The acquiring unit 110 is a communication interface that acquires the training data from another device, for example. Otherwise, the acquiring unit 110 may acquire the training data held by the learning device 100. For example, the learning device 100 includes a storage unit (not illustrated), and the acquiring unit 110 is an interface for reading the training data from the storage unit. The learning in the embodiment is supervised learning, for example. The training data in the supervised learning is a data set in which input data is associated with correct answer labels. The correct answer label may be referred to as teacher data.

The learning unit 120 performs the machine learning based on the training data acquired by the acquiring unit 110 and generates the learned model. In addition, the learning unit 120 according to the embodiment includes the following hardware. The hardware can include at least one of a circuit that processes a digital signal and a circuit that processes an analog signal. For example, the hardware can be configured by one or a plurality of circuit devices or one or a plurality of circuit elements mounted on a circuit board. The one or the plurality of circuit devices are, for example, IC. The one or a plurality of circuit elements are, for example, resistors, capacitors, and the like.

The learning unit 120 may be realized by the following processor. The learning device 100 according to the embodiment includes a memory that stores information, and a processor that operates based on the information stored in the memory. The information is, for example, a program and various data. The processor includes hardware. Various processors, such as a central processing unit (CPU), a graphics processing unit (GPU), and a digital signal processor (DSP) can be used as the processor. The memory may be a semiconductor memory, such as a static random access memory (SRAM) or a dynamic random access memory (DRAM); a register; a magnetic storage device, such as a hard disk device; or an optical storage device, such as an optical disk device. For example, the memory stores a command that is readable by a computer, the command is executed by the processor, and accordingly, the function of each unit of the learning device 100 is realized as processing. The command here may be a command of a command set that configures the program, or a command for instructing an operation to the hardware circuit of the processor.

The presenting unit 130 presents the user with various information. For example, the presenting unit 130 is a display unit, such as a display that displays various types of information to the user. The display unit is, for example, a touch panel, and may also serve as an operation interface that receives an input operation from the user. However, the presentation by the presenting unit 130 is not limited to a display. For example, the presenting unit 130 may be a speaker, and presentation using sound may be performed. Otherwise, the presenting unit 130 may be a light emitting unit, such as a light emitting diode (LED), and may perform presentation using blinking of light or the like. The presenting unit 130 may combine a plurality of presentation methods.

More specifically, the acquiring unit 110 acquires an image and correction information designated for printing the image. The learning unit 120 performs the machine learning on the recommended correction information recommended for correction on a print target image based on the data set in which the image is associated with the correction information. In this manner, it becomes possible to acquire the learning result by performing the learning in which image is associated with the correction information designated when a print instruction for the image is given. By using the learning result, it becomes possible to set appropriate correction information considering the correction processing in past printing. In particular, when a print history by a given user is used as the data set, the learning processing for enabling the setting of the correction information that reflects the preference of the user can be realized. A specific flow of the learning processing will be described later with reference to FIGS. 7 and 8.

Figure 2:
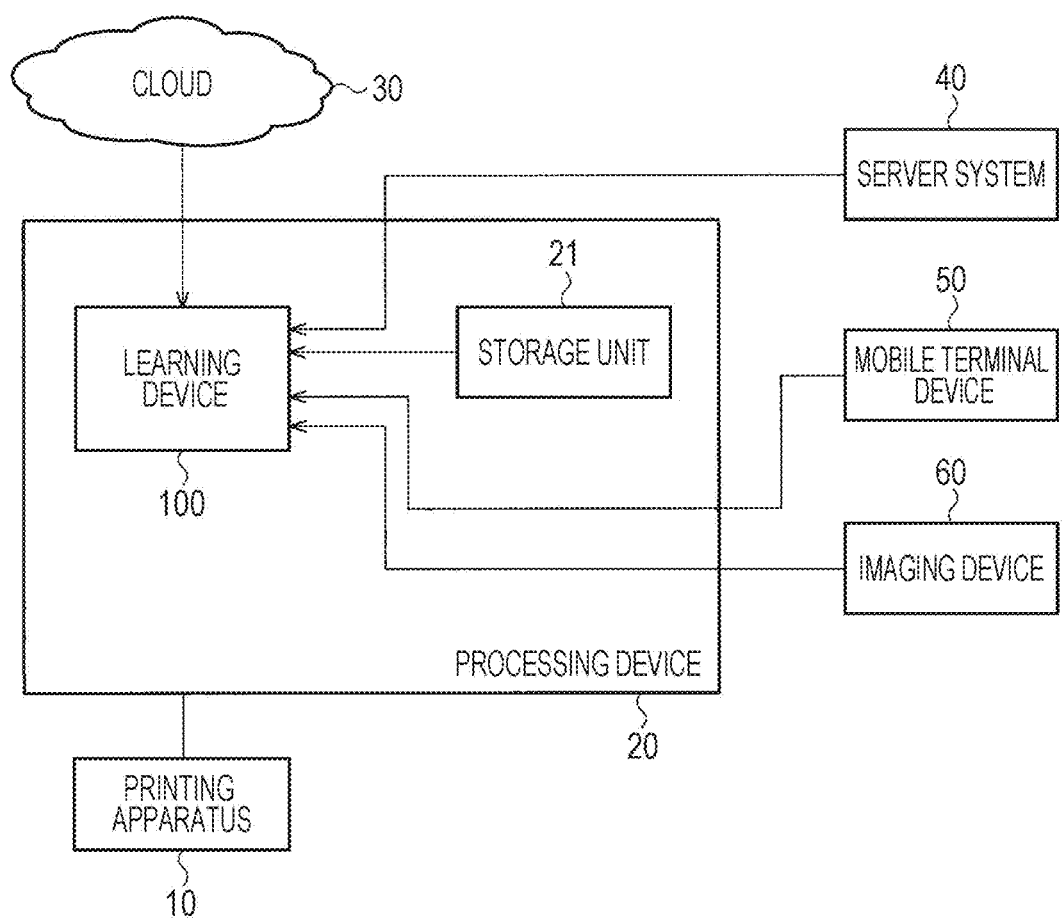
FIG. 2 illustrates a configuration example of a system including the learning device.

FIG. 2 is a view illustrating a configuration example of a system including the learning device 100 according to the embodiment. The learning device 100 is included in the processing device 20 coupled to the printing apparatus 10, for example. Here, the printing apparatus 10 may be a multifunction peripheral (MFP) having a plurality of functions including a printing function.

The printing apparatus 10 can include a plurality of CPU, such as a main CPU and a sub CPU, or a micro-processing unit (MPU). The main CPU performs control of each part of the printing apparatus 10 and overall control. The sub CPU performs various processing for printing, for example. In addition, the printing apparatus 10 includes a print engine. The print engine is a mechanical configuration that executes image printing on a print medium. The print engine includes, for example, a transport mechanism, an ink jet type discharge head, a carriage driving mechanism including the discharge head, and the like. The print engine prints an image on a print medium by discharging an ink from the discharge head onto the print medium transported by the transport mechanism. As the print medium, various media, such as paper or cloth, can be used. In addition, the specific configuration of the print engine is not limited to the one exemplified here, and the print engine may be printed with a toner by an electronic processing system, or may be printed by a thermal transfer method. In addition, the printing apparatus 10 can include various configurations widely used in printing apparatuses, such as a communication unit, a storage unit, a display unit, and an operation unit.

The processing device 20 includes the learning device 100 and a storage unit 21. In addition, the processing device 20 includes a print application. The print application is software for causing a user to select the print target image and to execute a print instruction. The print application performs the correction processing based on the correction information for the print target image. Further, the print application performs processing for causing the printing apparatus 10 to print the print target image based on the print instruction of the user.

For example, the learning device 100 is a device that performs processing according to the print application in addition to the learning processing. More specifically, when the function of each unit of the learning device 100 is realized by the processor or the like operating according to learning software in which an algorithm related to the learning processing is described, the processor performs an operation according to the print application. In this manner, the learning device 100 can perform display processing of candidate images for the print target image, display processing of a print instruction button, user operation receiving processing, print execution processing, and the like. In addition, the print application may be software including a printer driver that is software for controlling the printing apparatus 10. Otherwise, the print application may be realized as software different from the printer driver. For example, a printer driver that is a print application communicates with the printing apparatus 10 by the printer driver itself or through another communication application or operating system.

Various modes are considered for a storage medium that stores the candidate images for the print target image. For example, the candidate image may be stored in the storage unit 21 of the processing device 20. The candidate image may be stored in the storage unit, such as an HDD included in the server system 40. The processing device 20 and the server system 40 are connected to each other via a network. The network here may be wired or wireless. For example, communication between the processing device 20 and the server system 40 is wireless communication according to a Wi-Fi system. The Wi-Fi system is a wireless communication system based on, for example, the IEEE 802.11 standard and standards conforming thereto.

The candidate images for the print target image may be stored in a storage unit, such as a mobile terminal device 50 or an imaging device 60. The mobile terminal device 50 is, for example, a smartphone or a tablet terminal. The imaging device 60 is a digital camera. The storage units of the mobile terminal device 50 and the imaging device 60 may be a built-in memory or a memory card mounted in a memory card slot. The processing device 20 and the mobile terminal device 50 may be connected using wireless communication in accordance with a standard, such as Wi-Fi or Bluetooth (registered trademark), or may use wired connection in accordance with a standard, such as universal serial bus (USB). The connection between the processing device 20 and the imaging device 60 is the same.

In addition, the candidate images for the print target image may be stored in a cloud 30. Specifically, the candidate image may be stored in the storage medium realized as a cloud service. In the cloud service, the processing device 20 can refer to the candidate image stored on the network without being aware of a specific device including the storage medium. The network used for the cloud service is a public wireless communication network, such as the Internet.

When the print application of the processing device 20 receives the print instruction for the print target image, the print application outputs the print target image to which to the correction processing based on the set correction information is performed to the printing apparatus 10. When the learning device 100 has a function of the print application, the image selected as the print target image and the correction information actually used in image printing can be acquired in association with each other.

However, the learning device 100 according to the embodiment is not limited to the configuration described above. For example, the learning device 100 having a function of the print application may be included in another device, such as the mobile terminal device 50. In a broad sense, the learning device 100 may be included in a device that is not directly connected to the printing apparatus 10. In this case, the learning device 100 transmits a print instruction to the printing apparatus 10 via a printer driver included in the processing device 20. For example, the learning device 100 may be included in the server system 40 of FIG. 2 or may be included in another server system. The learning device 100 in this case is a Web application, for example. Otherwise, the learning device 100 may be included in another apparatus illustrated in FIG. 2, or may be included in an apparatus not illustrated in FIG. 2.

As described above, from the viewpoint of smooth acquisition of training data, it is desirable that the learning device 100 according to the embodiment has a function of the print application. However, the method according to the embodiment is not limited thereto. Specifically, the print application may be a program that operates on a processor different from the processor that realizes the functions of each unit of the learning device 100. In this case, management of the correction information is executed in the print application provided outside the learning device 100. The acquiring unit 110 of the learning device 100 performs processing for acquiring the training data including the image and the correction information from the print application.

2.2 Details of Data Set Used for Learning Processing

As described above, the training data used in the learning processing according to the embodiment is a data set in which at least the image is associated with the correction information set when the print instruction for the image is given. By performing the learning processing using such a data set, it becomes possible to output the correction information that can realize the correction processing preferred by the user as recommended correction information.

Various methods for acquiring the data set in which the image is associated with the correction information are considered. For example, at a learning stage, similar to the method of the related art, the correction information with respect to the image may be manually performed by the user. Specifically, the acquiring unit 110 may acquire the printed image in association with the correction information applied to the image while repeating the actual printing processing. In this case, similar to the method of the related art, the manual correction processing is performed until the learning processing is completed, and after the learning processing is completed, the automatic correction processing using the learned model is performed.

Otherwise, the learning device 100 may acquire the data set in which the image is associated with the correction information by performing the presentation processing for acquiring the training data and the receiving processing of a user operation.

Figure 3:
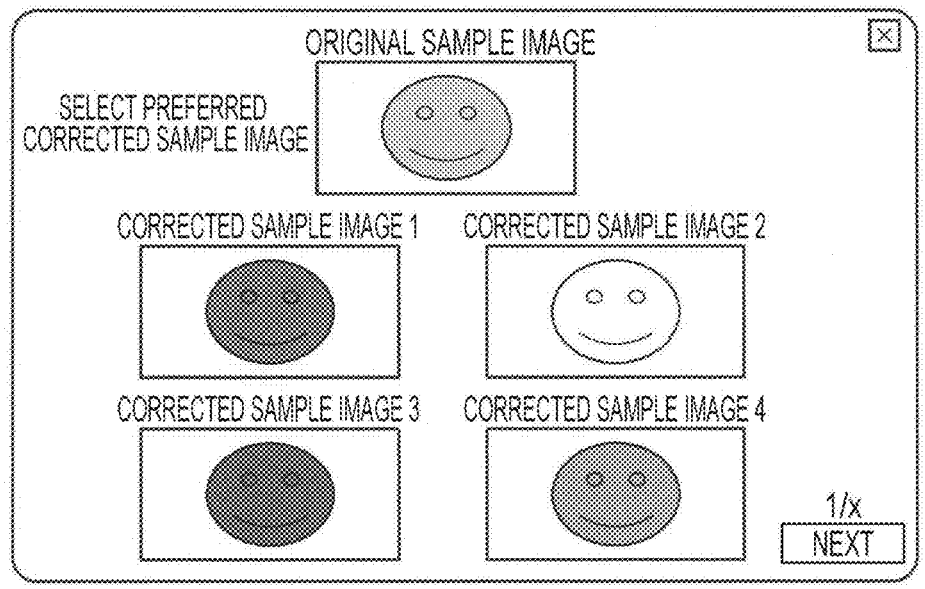
FIG. 3 illustrates an example of a presentation screen for acquiring a data set used for learning processing.

FIG. 3 is an example of a display screen for acquiring the training data. The learning device 100 includes the presenting unit 130 that presents the user with a plurality of sample images obtained by performing correction based on different pieces of the correction information on an original sample image that is a person image. The original sample image here is an image stored in advance for acquiring the training data. Corrected sample images 1 to 4 are images generated by applying correction information 1 to 4 that are different pieces of the correction information on the original sample image. In addition, the corrected sample image may be generated each time by the learning device 100 or may be generated in advance. The number of corrected sample images is not limited to four.

The learning unit 120 performs machine learning based on the data set in which the correction information corresponding to the sample image selected from the plurality of sample images is associated with the original sample image. For example, when the corrected sample image i (i is an integer from 1 to 4) is selected by the user, the acquiring unit 110 acquires the data set in which the original sample image that is an image before the correction processing is associated with the correction information i used for generating the corrected sample image i. In this manner, it becomes possible to acquire the data set in which a given image is associated with the correction information for executing the correction processing according to the preference of the user with respect to the image. When the learning unit 120 performs learning based on the data set, the learning processing that reflects the preference of the user can be performed.

Considering the accuracy of the learning processing, that is, the accuracy of the recommended correction information output based on the learning result, it is desirable that the number of pieces of training data used for the learning is large. Further, regarding the types of images, it is desirable to include not only a person image but also other types of images, such as a landscape image, in the learning target. Accordingly, the presenting unit 130 presents the plurality of sample images obtained by performing correction based on different pieces of the correction information on a first original sample image. In addition, the presenting unit 130 presents the plurality of sample images obtained by performing correction based on different pieces of the correction information on a second original sample image different from the first original sample image. In this manner, the learning processing for the plurality of types of images is performed, and thus, the learning accuracy can be improved. The difference in type is a difference in subjects included in the image.

Figure 4:
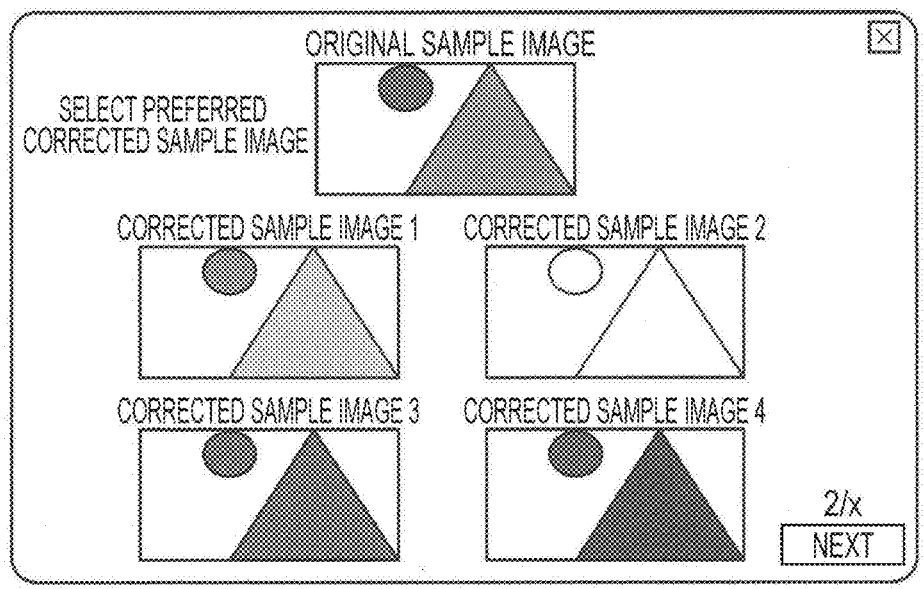
FIG. 4 illustrates an example of the presentation screen for acquiring the data set used for the learning processing.

FIG. 4 is an example of the display screen for acquiring the training data. The presenting unit 130 presents the user with the plurality of sample images obtained by performing correction based on different pieces of the correction information on the original sample image that is a landscape image. The processing in the acquiring unit 110 and the learning unit 120 is the same as that in the case of FIG. 3. The acquiring unit 110 acquires the original sample image and the correction information corresponding to the selected sample image. The learning unit 120 performs the learning processing based on the data set in which the information acquired by the acquiring unit 110 is associated.

In addition, the number of original sample images presented by the presenting unit 130 is not limited to two, and may be three or more. The presenting unit 130 may present the plurality of original sample images of the same type. For example, the presenting unit 130 performs the same presentation as that in FIG. 3 using a plurality of person images having different characteristics as original sample images. The user repeatedly executes a selection operation of one corrected sample image and a pressing operation of the "next" button on each presented screen. In this manner, the learning accuracy can be further improved by increasing the types and number of original sample images.

The learning unit 120 performs the machine learning based on the data set in which the correction information of the sample image selected from the plurality of sample images is associated with the original sample image, and accordingly, the parameters to be learned by the learning unit 120 are set. The parameter here is a parameter determined by the learning processing and a parameter for performing the arithmetic operation with respect to the output data from the input data in the inference processing, and is, for example, a weighting coefficient in a neural network which will be described later. In addition, the learning unit 120 may set initial values of parameters by the machine learning based on the screens of FIGS. 3 and 4. By setting the initial values of the parameters, an initial learned model is generated.

The learning processing according to the embodiment includes initial learning for generating the initial learned model and additional learning for updating the learned model, and the initial learning may be performed using the screens illustrated in FIGS. 3 and 4. The additional learning is performed in parallel with the inference processing, as will be described later with reference to FIGS. 17 to 19. When the additional learning is a premise, the learned model can be updated according to the preference of the user by the additional learning, and thus the learning accuracy required for the initial learning is not extremely high. Therefore, for example, it is not necessary to extremely increase the number of original sample images, and the burden on the user in the initial learning can be reduced.

However, the method according to the embodiment does not require the additional learning. In other words, the learned model learned based on the screens of FIGS. 3 and 4 may be used in a fixed manner. In this case, since the corrected sample image is selected by the user, the learning processing that reflects the preference of the user is also possible. In addition, in consideration of accuracy, it is desirable that the number and type of original sample images when no additional learning is performed are larger than those when the additional learning is performed.

Figure 5:
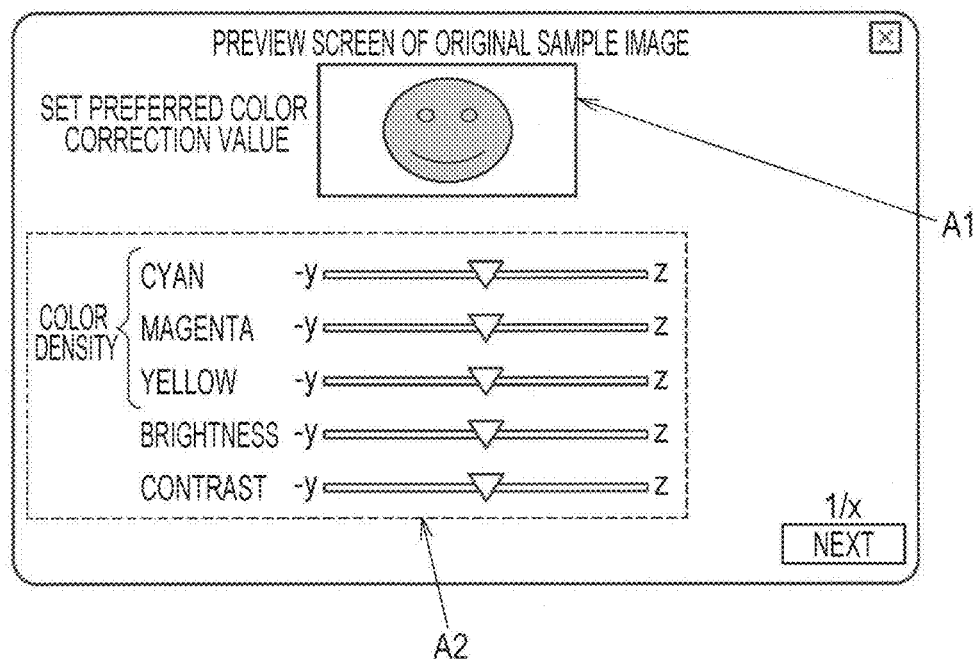
FIG. 5 illustrates an example of the presentation screen for acquiring the data set used for the learning processing.

FIG. 5 is another example of the display screen for acquiring the training data. The presenting unit 130 presents the user with the original sample image. The presenting unit 130 presents a screen for the user to input the correction information. In the example of FIG. 5, the display screen includes an original sample image that is a person image, and a preview area A1 of the sample image after the correction processing based on the current correction information is performed. The display screen also includes an input area A2 for inputting five correction values included in the correction information. The five correction values are cyan color density, magenta color density, yellow color density, brightness, and contrast, and input is performed by a slider. The configuration for inputting the correction value is not limited to the slider, and various modification examples, such as inputting a numerical value, into the box are possible.

In the initial state, the original sample image is displayed in the preview area A1, and each correction value in the input area A2 is set to a given initial value. The user changes the value of the correction information by adjusting the slider on the screen of FIG. 5. When the correction information is changed, the learning device 100 performs the correction processing with respect to the original sample image based on the changed correction information, and displays the correction processing result in the preview area A1.

The acquiring unit 110 acquires the correction information input by the user based on the presented original sample image. More specifically, the acquiring unit 110 acquires the correction information when the user presses the "Next" button in association with the original sample image. The learning unit 120 performs the machine learning based on the data set in which the original sample image is associated with the correction information. In this manner, it becomes possible to acquire the data set in which a given image is associated with the correction information for executing the correction processing according to the preference of the user with respect to the image. Compared with the method of FIG. 3, although the burden on the user increases, it becomes possible to acquire the correction information that more reflects the preference of the user.

Figure 6:
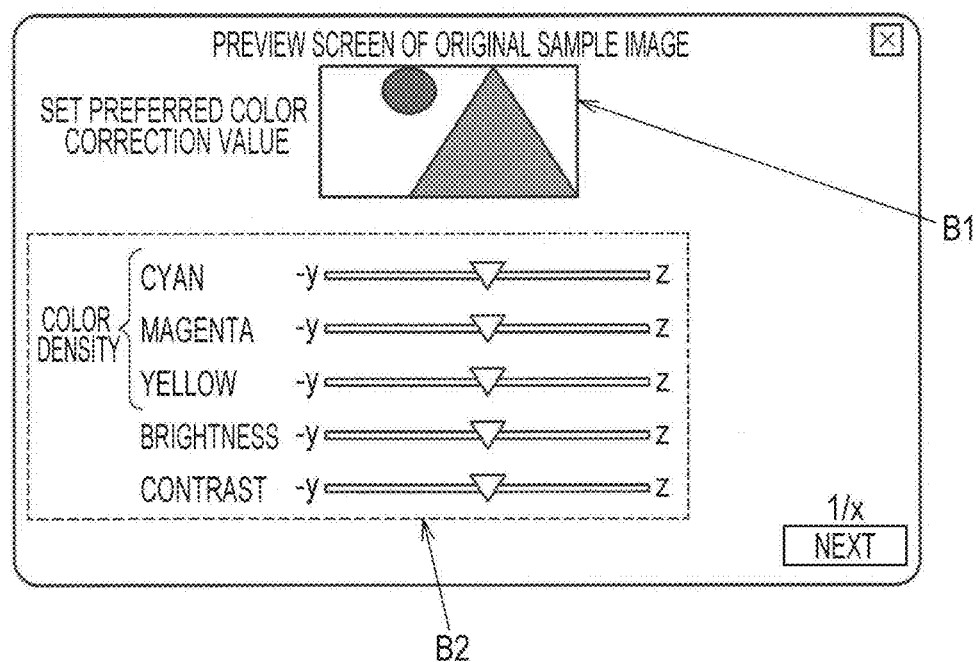
FIG. 6 illustrates an example of the presentation screen for acquiring the data set used for the learning processing.

In addition, the point that it is desirable that the number and type of training data used for the learning is large is the same as that when the screens illustrated in FIGS. 3 and 4 are used. FIG. 6 is another example of the display screen for acquiring the training data. The presenting unit 130 presents the user with a screen including a display area B1 for displaying an original sample image which is a landscape image, and an input area B2 for inputting the correction information. By presenting the screen illustrated in FIG. 6 in addition to FIG. 5, the learning accuracy can be improved. In addition, the point that the number of types of original sample images presented by the presenting unit 130 may be three or more, and a plurality of original sample images of the same type may be presented, is similar to that when the screens illustrated in FIGS. 3 and 4 are used.

The learning unit 120 performs the machine learning based on the data set in which the original sample image is associated with the correction information input based on the screens of FIGS. 5 and 6, and accordingly, the parameters to be learned by the learning unit 120 are set. In addition, the learning unit 120 may set the initial values of the parameters by the machine learning based on the screens of FIGS. 5 and 6. In other words, the learning processing according to the embodiment may include the initial learning and the additional learning using the screens illustrated in FIGS. 5 and 6. Otherwise, without performing the additional learning, the learned model learned based on the screens of FIGS. 5 and 6 and the like may be used in a fixed manner.

The data set in which the image is associated with the correction information has been described above. However, it is not hindered to add information other than the image and the correction information to the data set in order to perform highly accurate learning that reflects the preference of the user.

For example, the acquiring unit 110 acquires print output destination information that indicates a print output destination of the image in addition to the image and the correction information. The print output destination information is information for specifying the printing apparatus 10 used for printing. The information that specifies the printing apparatus 10 may be a serial number, a MAC address, or other identification information. The learning unit 120 performs the machine learning of the recommended correction information based on the data set in which the image is associated with the correction information and the print output destination information.

For example, the learning unit 120 learns the recommended correction information based on the data set using the image and the print output destination information as inputs and using the correction information as a correct answer label for the input. In this case, the learned model that is the learning result receives the image and the print output destination information that indicates the currently set print output destination, and performs processing for estimating the recommended correction information recommended when the image is printed at the print output destination.

Even for the same image, the printing result may differ depending on the printing apparatus 10. This is because the ink raw material, the number and type of ink colors, the print medium to be used, and the like differ depending on the printing apparatus 10. Therefore, first correction information for acquiring a desired printing result in the first printing apparatus may be different from second correction information for acquiring the desired printing result in the second printing apparatus. By adding the print output destination information to the learning, it is possible to realize the learning processing for making it possible to absorb a difference due to the printing apparatus 10 and acquire a desired printing result in any printing apparatus.

In addition, when performing the learning processing including the print output destination information, it is desirable to perform feedback based on a specific printing result. For example, the learning device 100 actually prints an image to which the correction processing based on the given correction information has been performed in the printing apparatus 10, and then requests the user to input the printing result. When the result is not the desired printing result, the user changes the correction information, instructs image printing to which the correction processing based on the changed correction information has been performed, and confirms the result again. The acquiring unit 110 acquires the image, the correction information, and the print output destination information when the input indicating that the desired printing result is received from the user, and the learning unit 120 performs the machine learning by using the data set in which the image is associated with the correction information and the print output destination information.

Otherwise, in the examples of FIGS. 3 and 4, the presenting unit 130 may perform presentation by printing the plurality of corrected sample images by the printing apparatus 10 instead of displaying the original sample image on the display or together with displaying the original sample image on the display. In this case, the corrected sample image is selected by the user based on the printing result. Since the correction information that reflects specific printing results is included in the data set, the effect of learning associated with the print output destinations is high. In addition, in the example of FIGS. 5 and 6, the correction processing result may be printed instead of displaying the preview image or together with displaying the preview image. However, in the examples of FIGS. 5 and 6, it is necessary to determine the timing for performing the printing processing in consideration of suppressing excessive printing. For example, it is desirable to allow the user to designate the print timing.

In an environment where the user can confirm the printing result, it is expected that the user will grasp the characteristics of each printing apparatus 10 while repeating the printing and input the correction information according to the printing apparatus 10. Therefore, it is not essential to provide feedback immediately after the printing results are output. By repeating the learning processing using a lot of training data, the learned model may be updated so as to gradually output that corresponds to the print output destination.

2.3 Specific Example of Learning

The learning processing based on the data set will be described in detail. Here, the machine learning using the neural network will be described.

Figure 7:
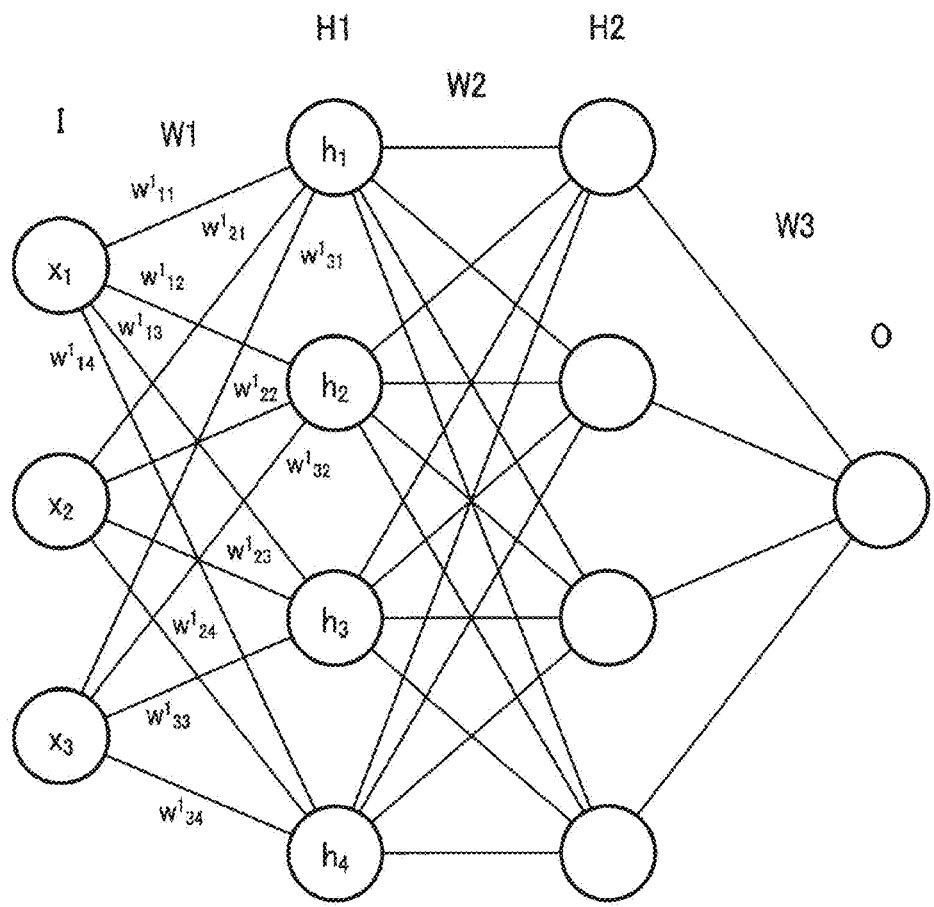
FIG. 7 illustrates a configuration example of a neural network.

FIG. 7 is a basic structure example of the neural network. The neural network is a mathematical model that simulates brain functions on a computer. One circle in FIG. 7 is called a node or a neuron. In the example of FIG. 7, the neural network has an input layer, two intermediate layers, and an output layer. The input layer is I, the intermediate layers are H1 and H2, and the output layer is O. In the example of FIG. 7, the number of neurons in the input layer is 3, the number of neurons in the intermediate layer is 4, and the number of neurons in the output layer is 1. However, various modification examples of the number of intermediate layers and the number of neurons included in each layer are possible. The neurons included in the input layer are each coupled to the neurons of H1 that is the first intermediate layer. Each neuron included in the first intermediate layer is coupled to the neurons of H2 which is the second intermediate layer, and each neuron included in the second intermediate layer is coupled to the neurons of the output layer. In addition, the intermediate layer may be referred to as a hidden layer.

Each input layer is a neuron that outputs an input value. In the example of FIG. 7, the neural network receives x1, x2, and x3 as inputs, and each neuron in the input layer outputs x1, x2, and x3, respectively. In addition, some preprocessing may be performed with respect to the input value, and each neuron in the input layer may output the preprocessed value.

In each neuron after the intermediate layer, an arithmetic operation that simulates how information is transmitted as an electrical signal in the brain is performed. In the brain, the ease with which information is transmitted changes corresponding to the connection strength of synapses, and thus, the neural network expresses the connection strength with a weight W.

W1 in FIG. 7 is a weight between the input layer and the first intermediate layer. W1 represents a set of weights between a given neuron included in the input layer and a given neuron included in the first intermediate layer. When the weight between the p-th neuron number in the input layer and the q-th neuron in the first intermediate layer is expressed as $w^1_{pq}$, W1 in FIG. 7 is information including 12 weights $w^1_{11}$ to $w^1_{34}$. More broadly, the weight W1 is information consisting of the number of weights equal to the product of the number of neurons in the input layer and the number of neurons in the first intermediate layer.

In the first neuron in the first intermediate layer, the arithmetic operation illustrated in the following equation (1) is performed. In one neuron, the output of each neuron of the previous layer coupled to the neuron is summed, and an arithmetic operation for adding a bias is performed. The bias in the following equation (1) is b1.

Equation 1

$$h_1 = f\left(\sum_i w^1_{i1} \cdot x_i + b_1\right) \quad (1)$$

Further, as illustrated in the above-described equation (1), an activation function f that is a non-linear function is used in the arithmetic operation with one neuron. As the activation function f, for example, an ReLU function illustrated in the following equation (2) is used. The ReLU function is a function that is 0 when the variable is 0 or less, and that is a value of the variable itself when the variable is greater than 0. However, it is known that various functions can be used as the activation function f, and a sigmoid function may be used, or a function obtained by improving the ReLU function may be used. In the above-described equation (1), the arithmetic equation for h1 is illustrated, but the same arithmetic operation may be performed for other neurons in the first intermediate layer.

Equation 2

$$f(x) = \max(0, x) = \begin{cases} 0 & (x \leq 0) \\ x & (x \geq 0) \end{cases} \quad (2)$$

The same applies to the subsequent layers. For example, when the weight between the first intermediate layer and the second intermediate layer is W2, in the neuron of the second intermediate layer, a product-sum operation using the output of the first intermediate layer and the weight W2 is performed, the bias is added, and an arithmetic operation for applying the activation function is performed.

In the neuron of the output layer, the output of the previous layer is weighted and added, and the arithmetic operation of adding the bias is performed. In the example of FIG. 7, the layer immediately one layer before the output layer is the second intermediate layer. The neural network uses the arithmetic operation result in the output layer as the output of the neural network. Otherwise, the result of performing some post-processing with respect to the arithmetic operation result of the output layer, may be output.

As can be seen from the description above, it is necessary to set appropriate weights and biases in order to obtain a desired output from the input. Hereinafter, the weight is also expressed as a weighting coefficient. The weighting coefficient may include the bias. In the learning, a data set in which a given input x is associated with a correct output t at the input is prepared. The correct output t is teacher data. The learning processing of the neural network can be considered as processing for obtaining the most probable weighting coefficient based on the data set. In the learning processing of the neural network, an error backpropagation method (backpropagation) is widely known.

Figure 8:
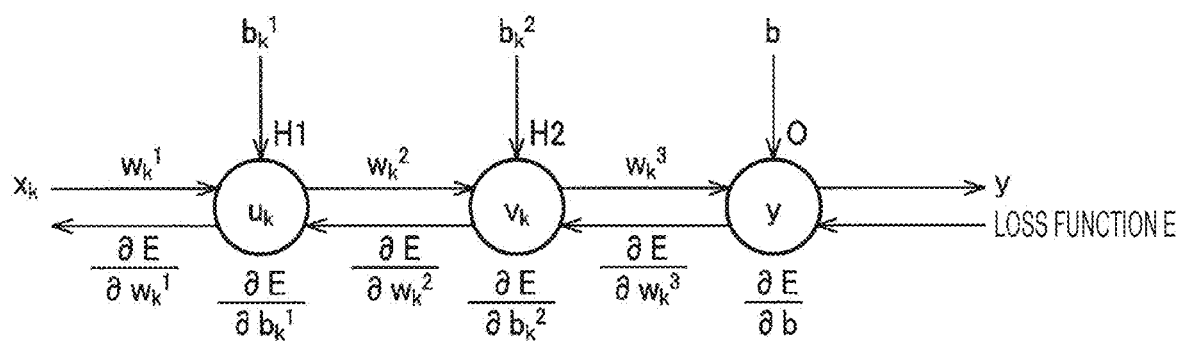
FIG. 8 illustrates a view for describing an error back-propagation method.

FIG. 8 illustrates a view for describing the error backpropagation method. In FIG. 8, for simplification of description, processing focusing on one neuron is illustrated for each of the first intermediate layer, the second intermediate layer, and the output layer. Further, the learning processing of the neural network is not limited to the one using the error backpropagation method.

In the error backpropagation method, the parameters are updated by repeating a forward pass and a backward pass. The parameter here is the above-described weighting coefficient. First, the output y is calculated by using the input x and the weighting coefficient at this time. In addition, the initial value of the weighting coefficient can be variously set. In the example of FIG. 8, the arithmetic operation of the following equations (3) to (5) are performed, and y is calculated from xk. In the following equations (3) to (5), u indicates the output of the first intermediate layer, and v indicates the output of the second intermediate layer.

Equation 3

$$y = \sum_{k=1}^{n}(w_k^3 \cdot v_k) + b \quad (3)$$

Equation 4

$$v = f\left(\sum_{k=1}^{n}(w_k^2 \cdot u_k) + b^2\right) \quad (4)$$

Equation 5

$$u = f\left(\sum_{k=1}^{n}(w_k^1 \cdot x_k) + b^1\right) \quad (5)$$

In addition, a loss function E is obtained based on the obtained output y and teacher data t that corresponds to the input x. The loss function E is, for example, the following equation (6), but may be a simple difference (y−t) or another loss function. The processing until the loss function E is obtained is called forward pass.

Equation 6

$$E = 1/2(y-t)^2 \quad (6)$$

After the loss function E is obtained by the forward pass, each parameter is updated using a partial differential of the loss function E as illustrated in the following equations (7) to (12). In the following equations (7) to (12), the value with the subscript "+1" indicates the value after update processing. For example, $b_{+1}$ indicates the value of b after the update processing. In addition, η indicates a learning rate. The learning rate is not constant and is preferably changed corresponding to a learning situation.

Equation 7

$$b_{+1} = b - \eta \frac{\partial E}{\partial b} \quad (7)$$

Equation 8

$$w_{k+1}^3 = w_k^3 - \eta \frac{\partial E}{\partial w_k^3} \quad (8)$$

Equation 9

$$b_{k+1}^2 = b_k^2 - \eta \frac{\partial E}{\partial b_k^2} \quad (9)$$

Equation 10

$$w_{k+1}^2 = w_k^2 - \eta \frac{\partial E}{\partial w_k^2} \quad (10)$$

Equation 11

$$b_{k+1}^1 = b_k^1 - \eta \frac{\partial E}{\partial b_k^1} \quad (11)$$

Equation 12

$$w_{k+1}^1 = w_k^1 - \eta \frac{\partial E}{\partial w_k^1} \quad (12)$$

At this time, the partial differential of the loss function E for each parameter is calculated from the output layer to the input layer using a chain rate. Specifically, each partial differential illustrated in the above-described equations (7) to (12) can be easily obtained by sequentially calculating the following equations (13) to (18). In addition, when the ReLU function of the above-described equation (2) is used as the activation function f, a differential value is 0 or 1, and thus, the arithmetic operation of the partial differential is easy. A series of processing using the equations (7) to (18) is called backward pass.

Equation 13

$$\frac{\partial E}{\partial b} = \frac{\partial E}{\partial y} \cdot \frac{\partial y}{\partial b} = (y-t) \quad (13)$$

Equation 14

$$\frac{\partial E}{\partial w_k^3} = \frac{\partial E}{\partial y} \cdot \frac{\partial y}{\partial w_k^3} = (y-t) \cdot v_k \quad (14)$$

Equation 15

$$\frac{\partial E}{\partial b_k^2} = \frac{\partial E}{\partial y} \cdot \frac{\partial y}{\partial v_k} \cdot \frac{\partial v_k}{\partial b_k^2} = (y-t) \cdot w_k^3 \cdot f'(v_k) \quad (15)$$

Equation 16

$$\frac{\partial E}{\partial w_k^2} = \frac{\partial E}{\partial y} \cdot \frac{\partial y}{\partial v_k} \cdot \frac{\partial v_k}{\partial w_k^2} = (y-t) \cdot w_k^3 \cdot f'(v_k) \cdot u_k \quad (16)$$

Equation 17

$$\frac{\partial E}{\partial b_k^1} = \frac{\partial E}{\partial y} \cdot \frac{\partial y}{\partial v_k} \cdot \frac{\partial v_k}{\partial u_k} \cdot \frac{\partial u_k}{\partial b_k^1} = (y-t) \cdot w_k^3 \cdot f'(v_k) \cdot w_k^2 \cdot f'(u_k) \quad (17)$$

Equation 18

$$\frac{\partial E}{\partial w_k^1} = \frac{\partial E}{\partial y} \cdot \frac{\partial y}{\partial v_k} \cdot \frac{\partial v_k}{\partial u_k} \cdot \frac{\partial u_k}{\partial w_k^1} = (y-t) \cdot w_k^3 \cdot f'(v_k) \cdot w_k^2 \cdot f'(u_k) \cdot x_k \quad (18)$$

In the learning processing according to the embodiment, x that is an input of the neural network is a pixel value of an image included in the training data. For example, the learning unit 120 resizes an image included in the training data in advance to vertical v pixels and horizontal h pixels, and uses v×h pixel values as inputs of the neural network. Specifically, one pixel value is input to one neuron in the input layer. However, the learning unit 120 is not prevented from performing some image processing, such as feature amount extraction processing, based on the image included in the training data and using the result of the image processing as an input of the neural network. As described above, other information, such as print output destination information, may be input to the neural network. The teacher data t is the correction information included in the training data. The correction information is information that indicates the above-described color density, and may be the color density value itself, or information that has been normalized so as to be within a given numerical range. The learned model that is the learning result receives the print target image as an input, and outputs the recommended correction information as an output. The recommended correction information includes a recommended value of color density. The print target image is input to the neural network after performing processing similar to the preprocessing in the learning processing, such as the processing for resizing the image to vertical v pixels and horizontal h pixels, and the feature amount extraction processing.

In FIG. 7, the neural network in a mode in which neurons in a given layer are coupled to all neurons in adjacent layers has been described. However, the configuration of the neural network is not limited thereto. For example, a convolutional neural network (CNN) may be used in the machine learning according to the embodiment. The CNN has a convolution layer and a pooling layer. The convolution layer performs a convolution operation. Here, the convolution operation is specifically filter processing. The pooling layer performs processing for reducing the vertical and horizontal sizes of data. For example, when the image data is input, the CNN can perform processing in consideration of the relationship between a given pixel and surrounding pixels thereof. In the CNN, the characteristics of the filter used for the convolution operation are learned by the machine learning. In other words, the weighting coefficient in the neural network includes the filter characteristics in the CNN.

As described above, the learning unit 120 generates the learned model by the machine learning. For example, the learned model is a neural network in which the weighting coefficients are set by learning. As illustrated in FIG. 7, the learned model has an input layer, an intermediate layer, and an output layer. In addition, in the learned model, the weighting coefficient between the input layer and the intermediate layer and the weighting coefficient between the intermediate layer and the output layer are set based on the data set in which the image is associated with the correction information designated for printing the image. As described above, the number of intermediate layers may be two or more, and in this case, the weighting coefficient between a given intermediate layer and the next intermediate layer is also set by learning based on the data set. In other words, the weighting coefficient in the embodiment includes at least a first weighting coefficient between the input layer and the intermediate layer and a second weighting coefficient between the intermediate layer and the output layer, and the weighting coefficients are set by the machine learning. The learned model causes the computer to function so as to input the data about the print target image to the input layer, perform the arithmetic operation based on the set weighting coefficients, and cause the computer to function so as to output data that indicates the recommended correction information from the output layer. The data that indicates the recommended correction information is data that indicates the recommended values for each piece of information included in the correction information.

Further, the method according to the embodiment may be applied to the learned model. The learned model is a learned model for determining correction settings for the print target image based on the input print target image. In the learned model, the input layer, the intermediate layer, and the output layer are provided, and the weighting coefficients between the input layer and the intermediate layer and between the intermediate layer and the output layer are set based on the data set in which the image is associated with the correction information designated for printing the image. The learned model causes the computer to function so as to input the input data about the print target image to the input layer, perform the arithmetic operation based on the set weighting coefficients, and output data that indicates the recommended correction information recommended for correcting the print target image from the output layer.

Above, an example in which the learned model is a model using the neural network has been described. However, the machine learning in the embodiment is not limited to the method using the neural network. For example, the method according to the embodiment can apply the machine learning of various widely known methods, such as a support vector machine (SVM), or a method developed from these methods.

3. Inference Processing 3.1 Configuration Example of Inference Device

Figure 9:
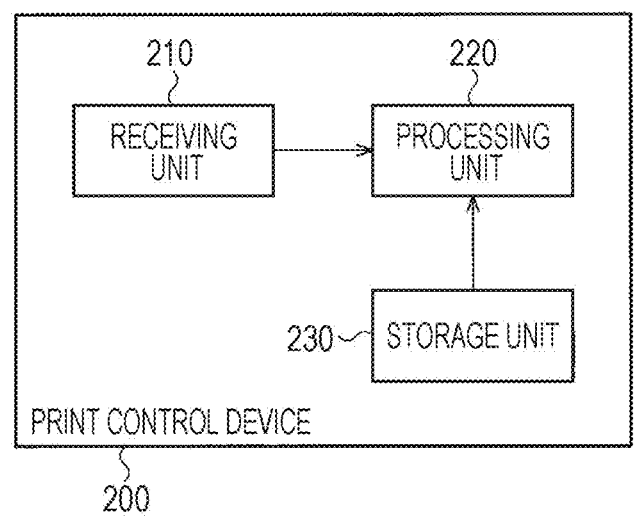
FIG. 9 illustrates a configuration example of a print control device.

FIG. 9 is a view illustrating a configuration example of the inference device according to the embodiment. The inference device is a print control device 200 that controls printing of the printing apparatus 10. The print control device 200 includes a receiving unit 210, a processing unit 220, and a storage unit 230.

The storage unit 230 stores the learned model that has performed the machine learning with respect to the recommended correction information recommended for the correction of the print target image based on the data set in which the image is associated with the correction information designated for printing the image. The receiving unit 210 receives the input of the print target image. The processing unit 220 determines the recommended correction information corresponding to the input print target image based on the learned model. Specifically, the processing unit 220 outputs information that indicates the color density, information that indicates the brightness, and information that indicates the contrast as recommended correction information.

The learned model is used as a program module that is a part of artificial intelligence software. The processing unit 220 outputs the data that indicates the recommended correction information for printing the print target image that is the input in accordance with the command from the learned model stored in the storage unit 230.

Similar to the learning unit 120 of the learning device 100, the processing unit 220 of the print control device 200 is configured by hardware including at least one of a circuit that processes a digital signal and a circuit that processes an analog signal. The processing unit 220 may be realized by the following processor. The print control device 200 according to the embodiment includes a memory that stores the information, and a processor that operates based on the information stored in the memory. As the processor, various processors, such as a CPU, a GPU, and a DSP, can be used. The memory may be a semiconductor memory, a register, a magnetic storage device, or an optical storage device.

In addition, the arithmetic operation in the processing unit 220 according to the learned model, that is, the arithmetic operation for outputting the output data based on the input data may be executed by software or may be executed by hardware. In other words, the product-sum operation, such as the above equation (1), or the filter operation in the CNN may be executed by the software. Otherwise, the above-described arithmetic operation may be executed by a circuit device, such as a field-programmable gate array (FPGA). Further, the above-described arithmetic operation may be executed by a combination of software and hardware. In this manner, the operation of the processing unit 220 according to the command from the learned model stored in the storage unit 230 can be realized by various modes.

Further, the print control device 200 may be one device or may include a plurality of devices. For example, the print control device 200 may be realized as a terminal device, such as a PC, and a server system operate in cooperation with each other. In addition, as will be described later with reference to FIGS. 17 to 19, the learned model according to the embodiment may be updated using the result of the inference processing. By updating the learned model, the preference of the user can be appropriately reflected. However, the learned model may be created in advance and the learned model may be used fixedly.

Figure 10:
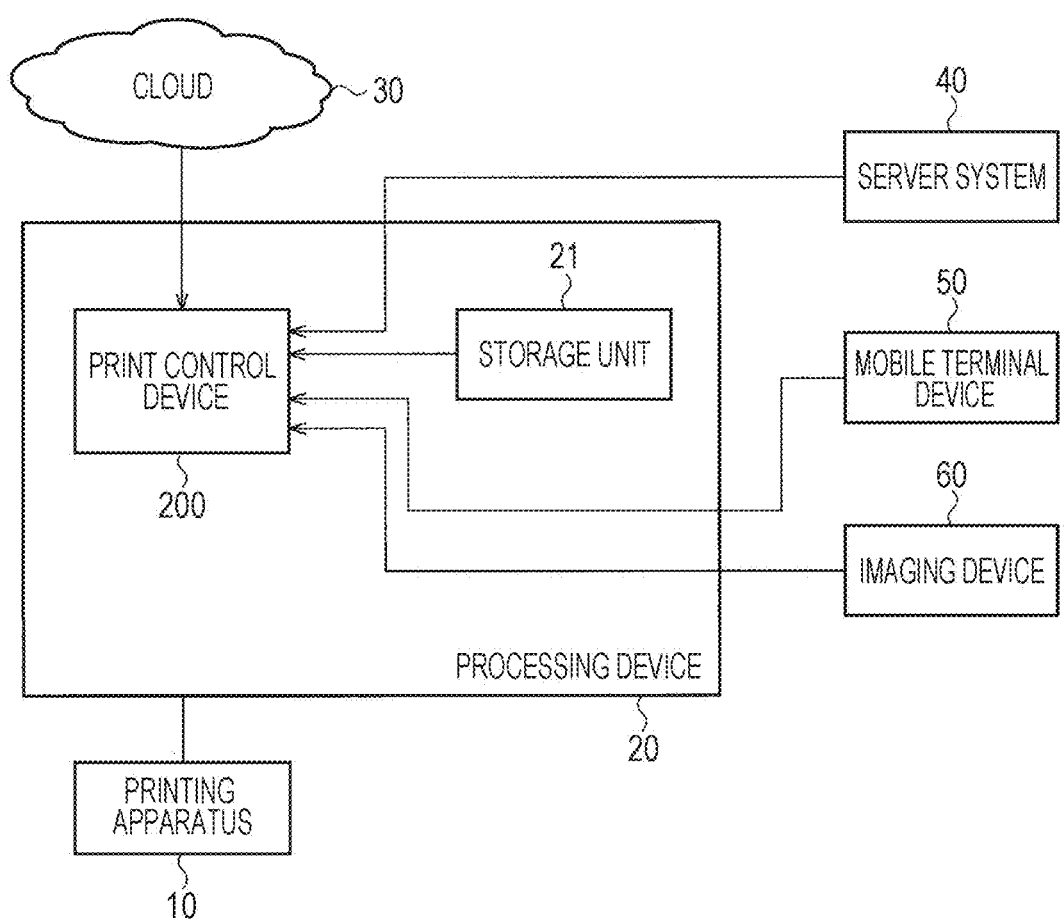
FIG. 10 illustrates a configuration example of a system including the print control device.

FIG. 10 is a configuration example of a system including the print control device 200. The print control device 200 is included in the processing device 20 connected to the printing apparatus 10, for example. The system configuration illustrated in FIG. 10 is the same as that illustrated in FIG. 2. The receiving unit 210 of the print control device 200 receives any one of images stored in various storage media, such as the cloud 30, the server system 40, the mobile terminal device 50, and the imaging device 60, as a print target image. The processing unit 220 performs processing for determining the correction information recommended for the print target image. For example, the print control device 200 includes a print application, and the print application performs correction processing based on the recommended correction information and display processing of the print target image after the correction processing. When the print application receives a print instruction operation from the user after the display processing, the print application performs the printing processing for the print target image. In this manner, it becomes possible to smoothly execute the presentation processing and the printing processing of the correction processing result based on the recommended correction information. In addition to the display processing of the print target image after the correction processing, the print application may perform the receiving processing of modification input of the correction information by the user. In this manner, it becomes possible to receive an appropriate modification when the recommended correction information does not match the preference of the user. In addition, the print control device 200 may not be limited to the one included in the processing device 20, and may be included in another device. However, in consideration of smoothly controlling the printing apparatus 10, the print control device 200 is preferably included in a device directly connected to the printing apparatus 10.

3.2 Specific Example of Inference Processing

Figure 11:
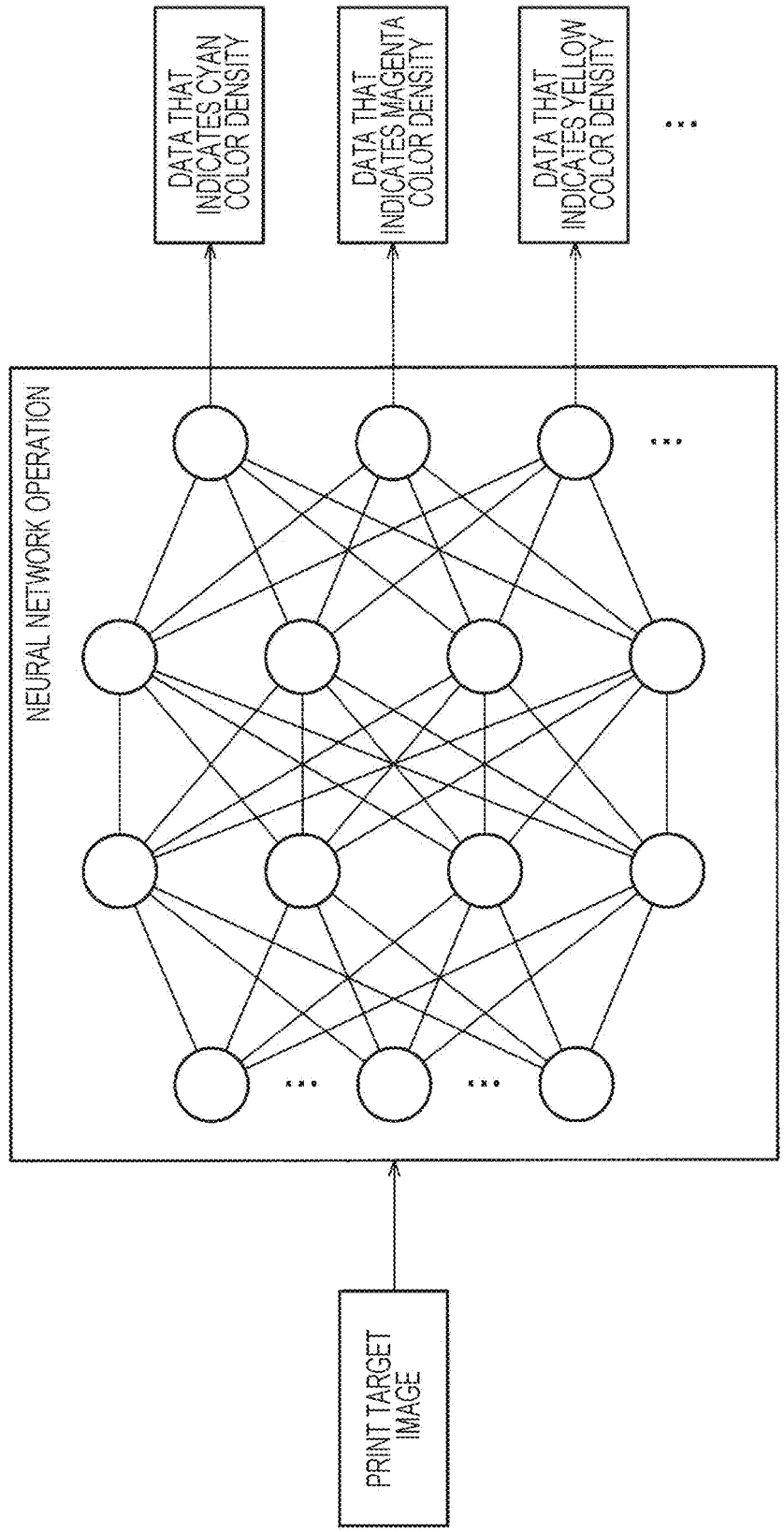
FIG. 11 illustrates a view for describing an example of input data and output data in inference processing.

FIG. 11 is a view illustrating a relationship between the input and the output in the inference processing according to the embodiment. In addition, in FIG. 11, the example that performs the neural network operation is described. The input in the inference processing is the print target image. The print target image here is specifically an image to which an operation of selecting is performed as the print target by the user. Further, the input in the inference processing may include the print output destination information for specifying the printing apparatus 10 set as the print output destination. The print output destination information is acquired from the printer driver. However, as described above in the learning processing, the print output destination information is not essential and can be omitted.

The processing unit 220 performs the neural network operation based on the input. In addition, the processing unit 220 outputs the recommended correction information that is the correction information recommended for printing the print target image, as output. The number of neurons in the output layer of the neural network is set to the number that corresponds to the type of information output as the correction information. For example, when the correction information includes five values of a cyan color density value, a magenta color density value, a yellow color density value, a brightness value, and a contrast value, the output layer has five neurons, and outputs five values as the recommended correction information. As described above, the output value of each neuron may be the value of the color density value itself, or may be other information that can specify the color density value or the like. In addition, one correction information may be obtained from the output values of the plurality of neurons, and various modification examples can be considered for the specific configuration of the neural network or the correction information specifying processing based on the output of the neural network.

Figure 12:
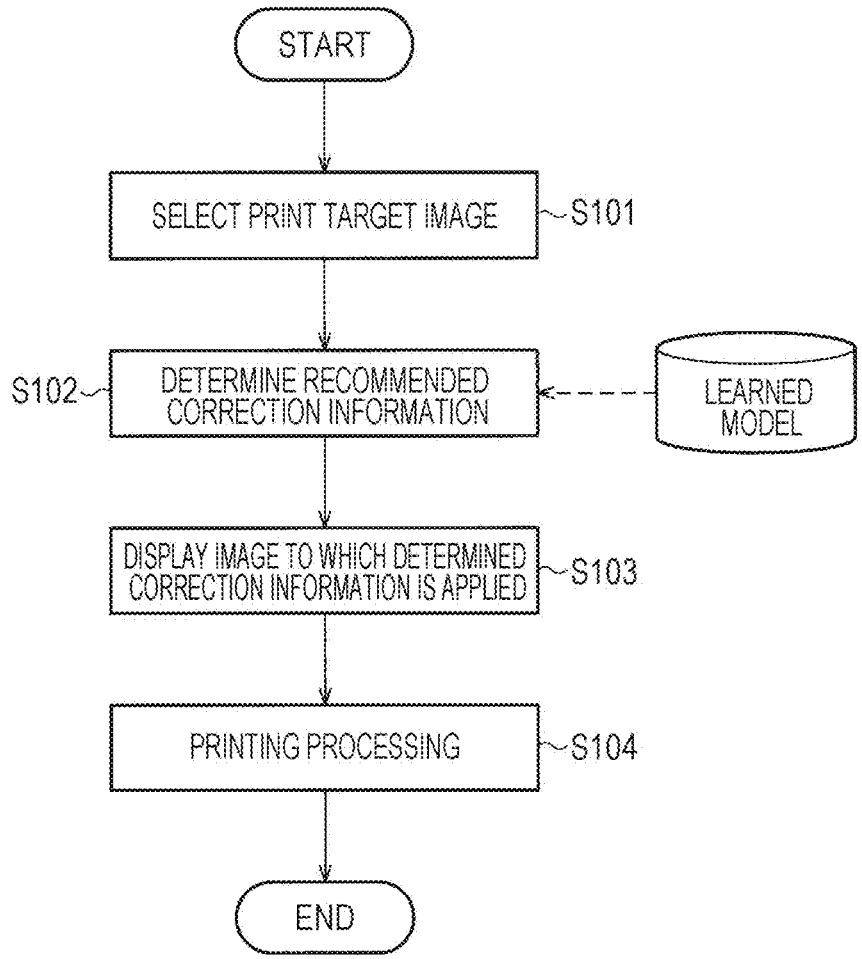
FIG. 12 illustrates a flowchart for describing the inference processing.

FIG. 12 is a flowchart for describing the inference processing in the print control device 200. When the processing is started, the processing unit 220 first receives a selection input of the print target image by the user (S101). As described above with reference to FIG. 10, when the print control device 200 includes the print application, the receiving unit 210 of the print control device 200 receives the print target image by directly receiving the selection input by the user. However, the receiving unit 210 may perform processing for receiving the print target image selected by the user from an external print application.

Next, the processing unit 220 estimates the recommended correction information including at least the color density by performing the neural network operation using the received print target image as an input (S102). The processing unit 220 performs processing for causing the presenting unit 130 to present the print target image to which the recommended correction information is applied (S103). Specifically, the presenting unit 130 is a display unit, and displays the result of performing the correction processing based on the recommended correction information for the print target image. Thereafter, the processing unit 220 performs processing for causing the printing apparatus 10 to print the print target image (S104). Accordingly, it becomes possible to perform the correction processing and the printing processing of the print target image based on the recommended correction information.

The display in S103 corresponds to a print preview screen. On the preview screen, the user may perform an input for instructing execution of printing, an input for stopping the printing processing, an input for modifying the correction information to match the preference of the user, and the like. When the input for instructing execution of printing is performed, the processing unit 220 executes the processing of S104. When an input for stopping the printing processing is performed, the processing unit 220 ends the processing without performing the printing processing of S104. When an input for modifying the correction information is performed, the processing unit 220 performs the correction processing based on the modified correction information, returns to S103 again, and displays the preview screen of the modified print target image.

4. Relearning Based on Inference Result

Above, the learning device 100 that performs the learning processing and the print control device 200 that performs the inference processing have been described. However, it is not prevented that either one of the devices performs both the learning processing and the inference processing.

For example, the learning device 100 includes a processing unit that outputs the recommended correction information corresponding to the print target image based on the learned model learned by the learning unit 120 and performs the correction processing based on the recommended correction information. Specifically, the processing unit here has the same configuration as that of the processing unit 220 of the print control device 200 illustrated in FIG. 9. In this manner, the learning device 100 can execute not only the learning processing but also the inference processing based on the learning result. Since the correction information is information, such as color density, even when the correction information is directly displayed, it is not easy for the user to understand the contents of the correction processing. In this regard, as the processing unit 220 performs the correction processing with respect to the print target image based on the recommended correction information, the change in the print target image due to the correction processing can be presented to the user in an easily understandable manner.

Moreover, in the description above, an example in which the learning processing and the inference processing are mainly performed has been described. For example, in the learning stage, the training data is accumulated in advance, and the learning processing is performed based on the accumulated training data. In the inference stage, the inference processing is performed by continuously using the generated learned model. In this case, the learned model once generated is fixed and is not expected to be updated.

However, the method according to the embodiment is not limited thereto, and the processing result in the inference stage may be fed back to the learning processing. Specifically, the learning unit 120 of the learning device 100 performs the machine learning with respect to the condition of the recommended correction information based on the recommended correction information recommended based on the result of the machine learning and the information that indicates whether the recommended correction information has been adopted or modified by the user. In this manner, since the learned model is updated based on the actual instruction of the user, it becomes possible to output the recommended correction information according to the preference of the user.

Figure 13:
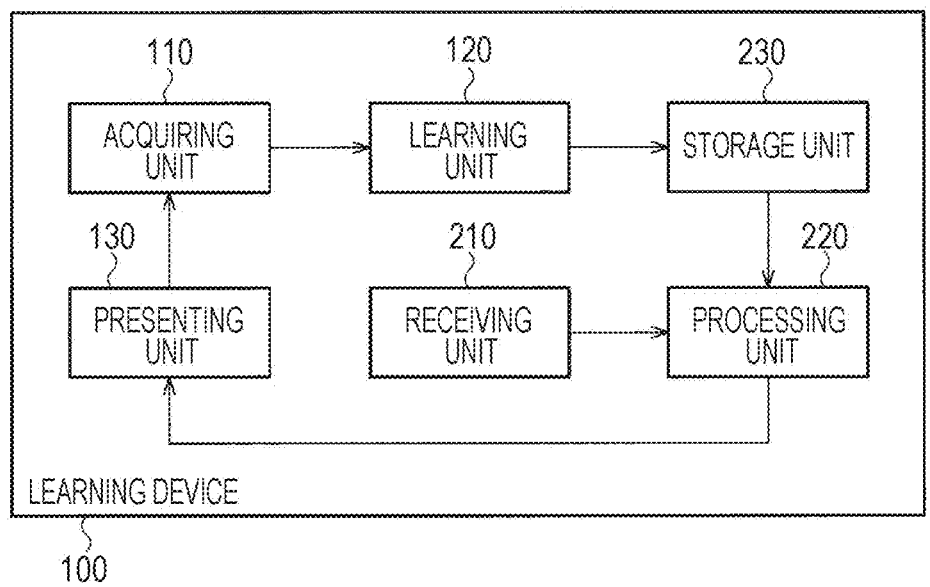
FIG. 13 illustrates another configuration example of the learning device.

FIG. 13 is a view illustrating a configuration example of the learning device 100 when the additional learning is performed. In addition to the acquiring unit 110, the learning unit 120, and the presenting unit 130, the learning device 100 includes the storage unit 230 that stores the learned model generated by the learning unit 120 through the machine learning, and the processing unit 220 that outputs the recommended correction information used for the correction of the print target image. The learning device 100 may include the receiving unit 210 that receives the print target image. In other words, the learning device 100 in FIG. 13 is a learning device that includes the same configuration as that of the print control device 200 illustrated in FIG. 9 in addition to the configuration illustrated in FIG. 1 and can operate as the print control device 200.

When the learning processing includes the initial learning and the additional learning, the initial learning may be performed by the method illustrated in FIGS. 3 and 4, or may be performed by the method illustrated in FIGS. 5 and 6. Otherwise, in a certain period, the printing processing may be repeated by using a method for allowing the user to manually input the correction information, and the initial learning may be performed based on the image printed in the period and the manually input correction information.

In view of the fact that the preference of the user can be learned in the additional learning, high accuracy is not required in the initial learning. Therefore, the learned model learned for general purposes may be used as the initial learning result. For example, the learning device 100 generates one general-purpose learned model in advance. The learning unit 120 may perform the additional learning using the learned model as an initial learning result.

Otherwise, the learning device 100 may create a plurality of general-purpose learned models in advance and determine any one of the learned models based on the user input. The learning unit 120 performs the additional learning using the selected learned model as an initial learning result.

Figure 14:
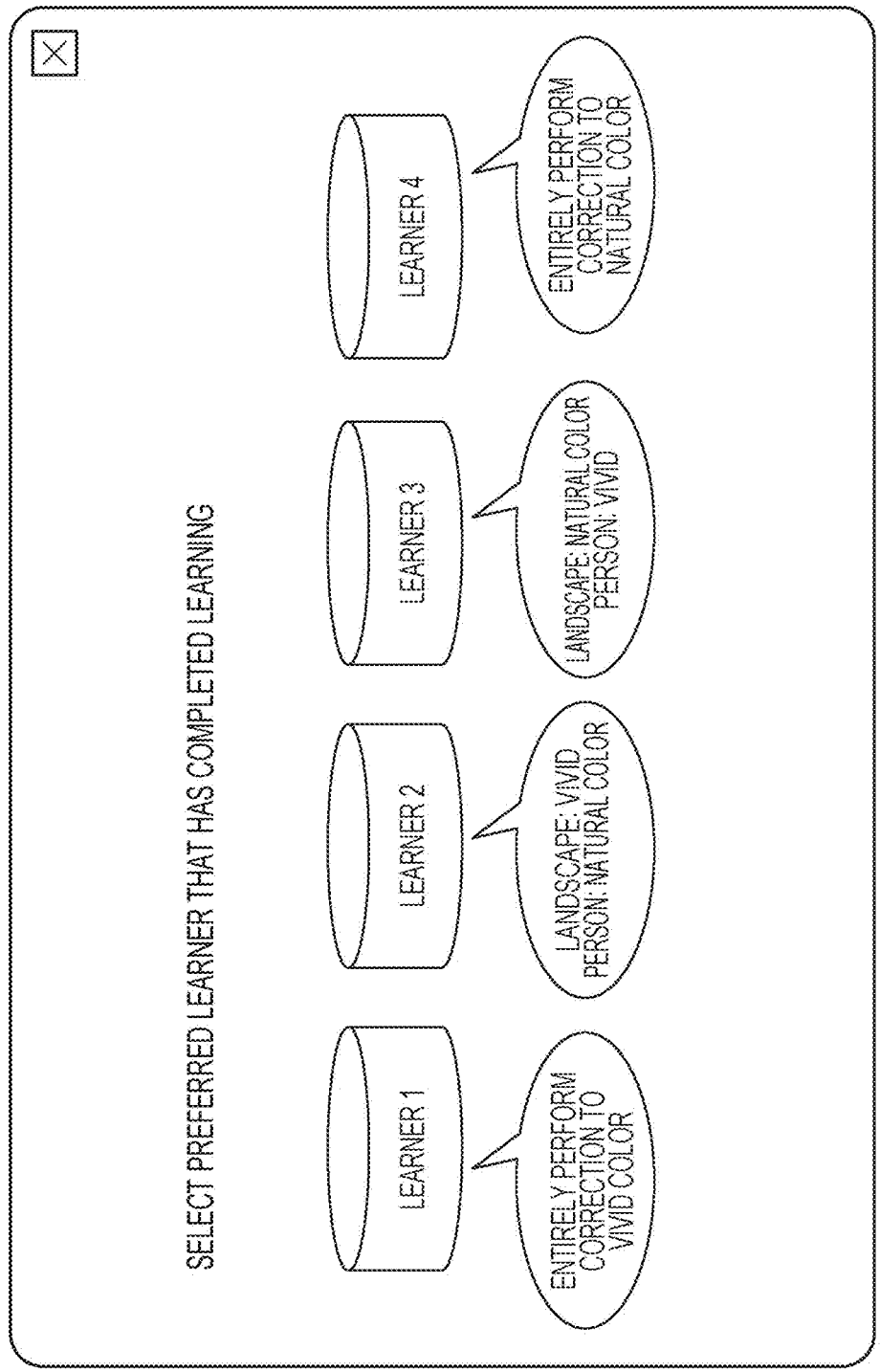
FIG. 14 illustrates an example of a presentation screen for selecting an initial learning model.

FIG. 14 is a view for describing a method for selecting one of the plurality of learned models. For example, the presenting unit 130 of the learning device 100 presents the user with the characteristics of the plurality of learning devices. Specifically, for each learned model, the presenting unit 130 displays what characteristics the result of performing the correction processing using the recommended correction information output based on the learned model has, in text or the like. In this manner, the user can easily select the learned model.

Figure 15:
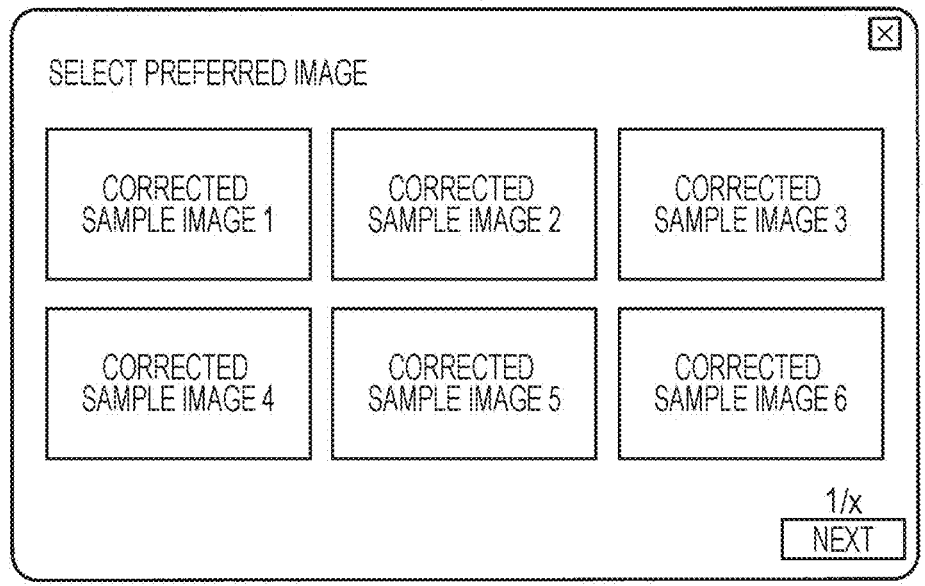
FIG. 15 illustrates an example of the presentation screen for selecting the initial learning model.
Figure 16:
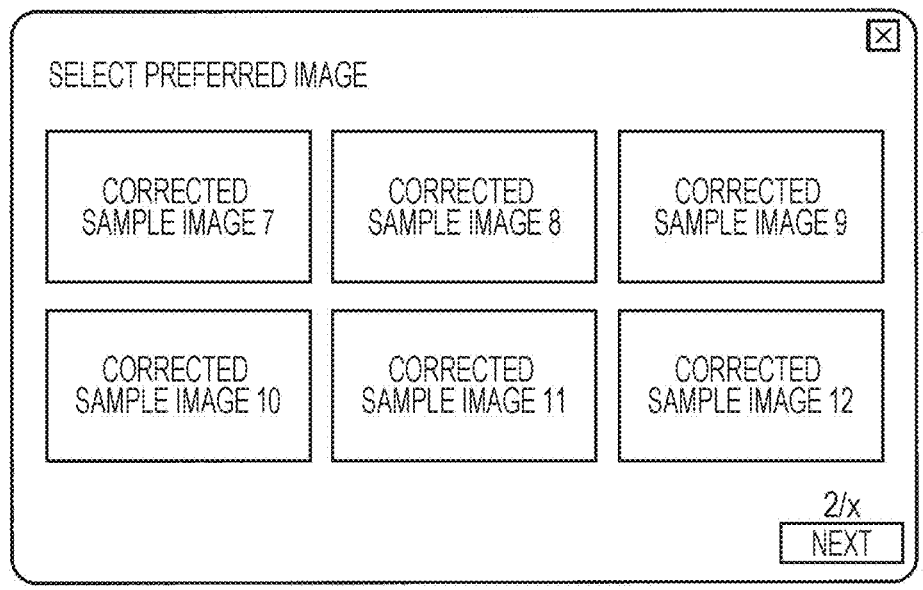
FIG. 16 illustrates an example of the presentation screen for selecting the initial learning model.

FIGS. 15 and 16 are views for describing another method for selecting one of the plurality of learned models. For example, the presenting unit 130 of the learning device 100 presents the corrected sample image which is the result of performing the correction processing based on the recommended correction information output based on each learned model with respect to the given original sample image. In the example of FIG. 15, the corrected sample images 1 to 6 are results obtained by performing the correction processing based on each of the six learned models with respect to one original sample image. The same applies to FIG. 16, and the corrected sample images 7 to 12 are results obtained by performing the correction processing based on each of the six learned models with respect to different original sample images. However, here, it is only necessary to select the learned model that is relatively close to the preference of the user from the plurality of learned models, and it is not necessary to unify the original sample images on one display screen. In addition, various modification examples can be made with respect to the specific example of the displayed corrected sample image. As the user selects an image close to the preference of the user on each screen, an appropriate learned model is selected as the initial learning result.

Figure 17:
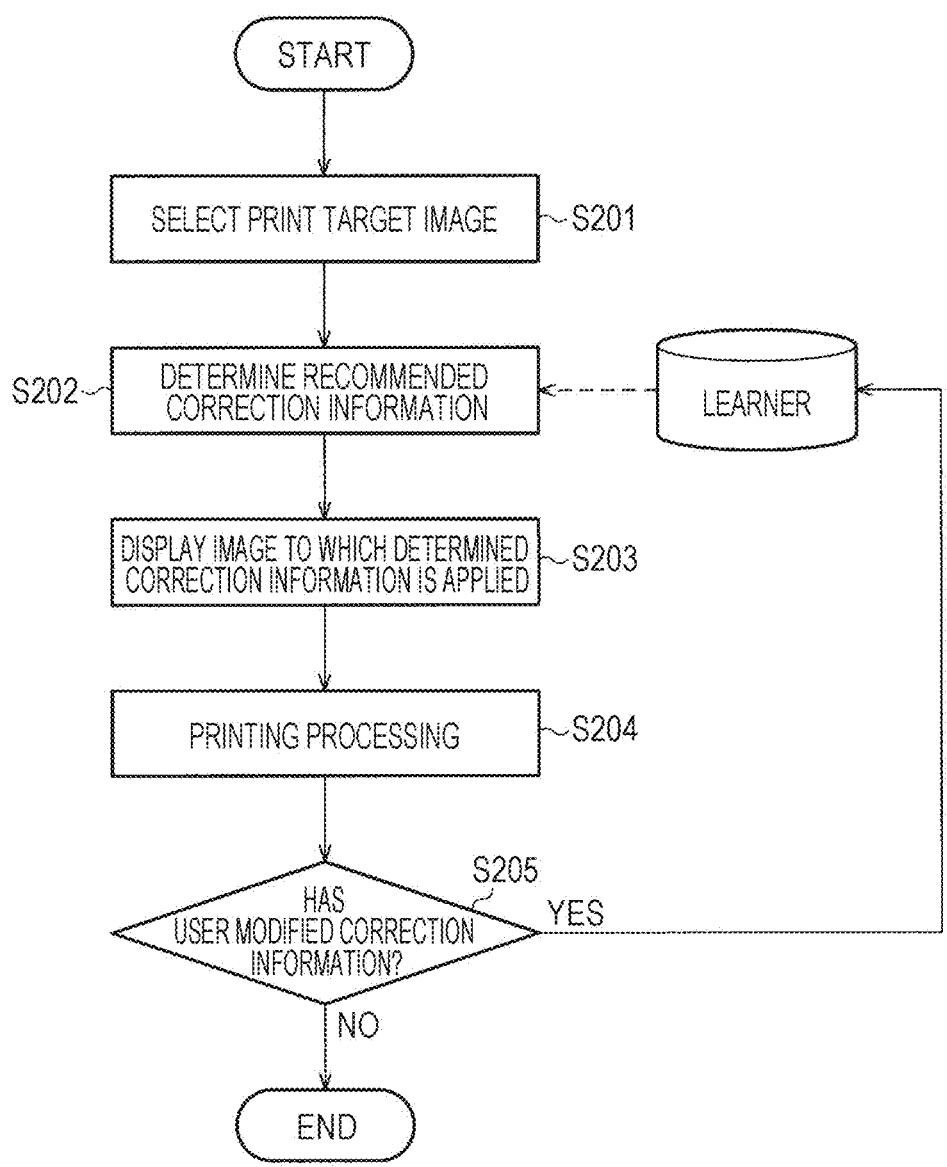
FIG. 17 illustrates a flowchart for describing processing for performing additional learning using an inference processing result.

FIG. 17 is a flowchart for describing the processing of the learning device 100 when performing the additional learning. S201 to S204 in FIG. 17 are the same as S101 to S104 in FIG. 12. In the processing of S203, the presenting unit 130 of the learning device 100 presents the print target image after the correction processing based on the recommended correction information is performed by the processing unit 220. Specifically, a preview screen is displayed, and the modification input of the user is received on the preview screen. After the printing processing of S204, the learning device 100 determines whether or not the user has modified the correction information on the preview screen (S205). When the user has modified the correction information (Yes in S205), the learning unit 120 updates the learned model by performing the additional learning.

Specifically, when the recommended correction information is modified based on the print target image presented by the presenting unit 130, and the instruction for selecting the correction information different from the recommended correction information is given (Yes in S205), the learning unit 120 performs the machine learning based on the data set in which the print target image before correction processing is associated with the modified correction information. In this manner, when the recommended correction information output by the existing learned model does not match the preference of the user, the additional learning using the correction result by the user is performed, and thus, it becomes possible to perform the modification according to the preference of the user. In addition, a learner in FIG. 17 corresponds to the learning device 100. Based on the determination result in S205, the learned model is updated by feedback to the learner. By updating the learned model, the value of the recommended correction information determined in the subsequent processing of S202 changes.

When the user has not modified the correction information (No in S205), it is considered that the recommended correction information output by the learned model was appropriate. Therefore, in this case, the learning unit 120 ends the processing without performing the additional learning.

Figure 18:
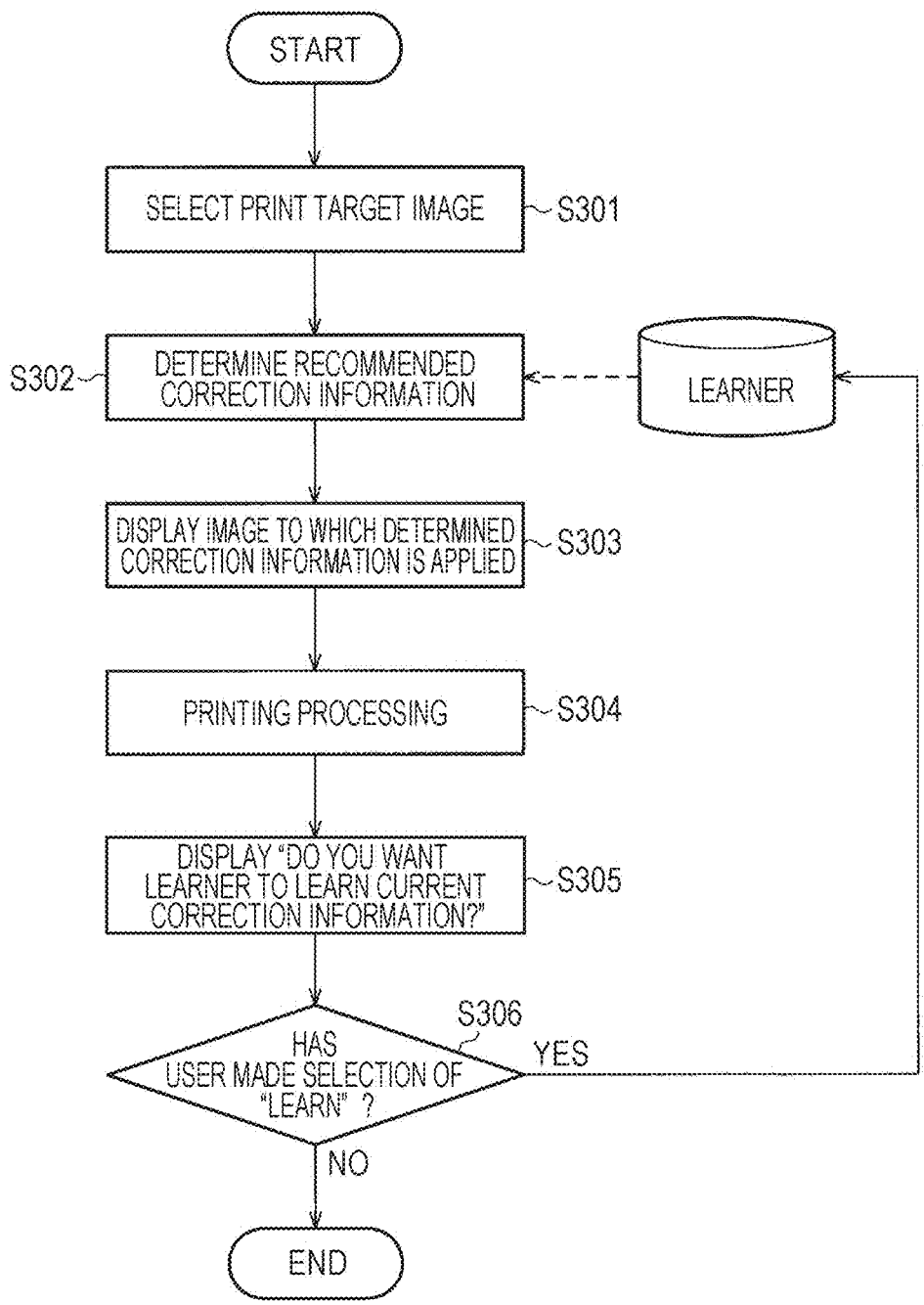
FIG. 18 illustrates a flowchart for describing processing for performing the additional learning using the inference processing result.

The processing of performing the additional learning is not limited to the processing according to the flowchart illustrated in FIG. 17. FIG. 18 is another flowchart for describing the processing of the learning device 100 when performing the additional learning. S301 to S304 in FIG. 18 are the same as S101 to S104 in FIG. 12. After the printing processing of S304, the presenting unit 130 of the learning device 100 performs processing for displaying a text "Do you want the learner to learn the current correction information?" (S305). Further, the presentation by the presenting unit 130 may be performed by other modes, such as voice.

For example, the user performs an input regarding whether or not the learning is performed in consideration of an actual printing result. The learning device 100 determines whether or not the user has made a selection of "learn" by receiving the input from the user (S306). In a case of Yes in S306, the learning unit 120 updates the learned model by performing the additional learning. In a case of No in S306, the learning unit 120 ends the processing without performing the additional learning.

In the processing illustrated in FIG. 17, the learning device 100 determines whether or not to perform the additional learning based on whether or not the recommended correction information has been modified. The processing illustrated in FIG. 18 is similar in that the correction information can be modified by the user, but the user can determine whether or not to perform the additional learning. For example, the color of the print target image on the display may differ from the color of the printing result. In this case, on the preview screen, the correction result based on the correction information matches the preference of the user, but there is a possibility that the user changes the determination that the actual printing result does not match the preference. In this regard, as illustrated in FIG. 18, as the user determines whether or not to perform the additional learning, the learning processing that considers the printing result becomes possible.

Figure 19:
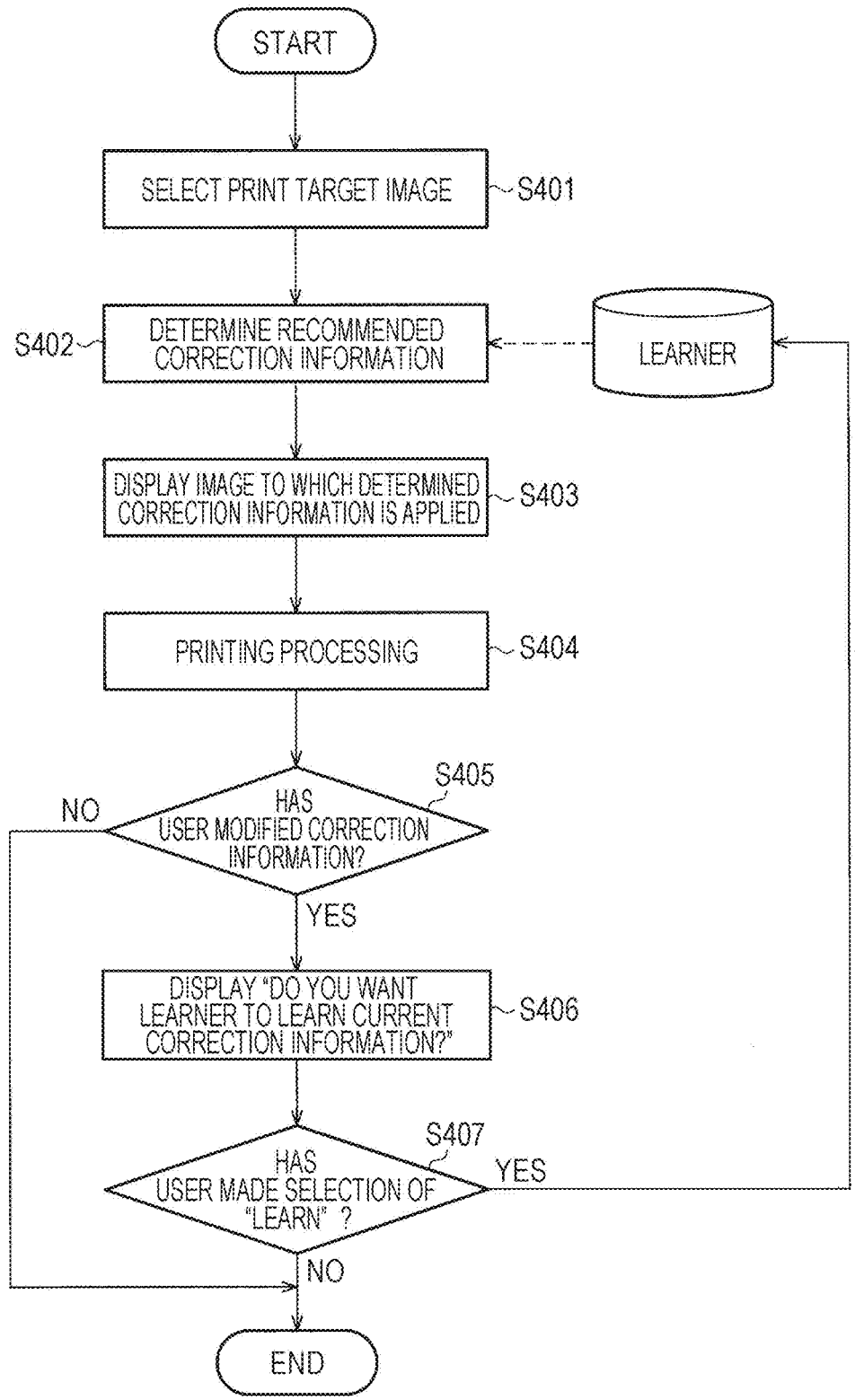
FIG. 19 illustrates a flowchart for describing processing for performing the additional learning using the inference processing result.

FIG. 19 is another flowchart for describing the processing of the learning device 100 when performing the additional learning. S401 to S404 in FIG. 19 are the same as S101 to S104 in FIG. 12. After the printing processing of S404, similar to S205 of FIG. 17, the learning device 100 determines whether or not the user has modified the correction information on the preview screen (S405). When the user has not modified the correction information (No in S405), the learning unit 120 ends the processing without performing the additional learning.

When the user has modified the correction information (Yes in S405), similar to S305 and S306 of FIG. 18, the learning device 100 displays the text "Do you want the learner to learn the current correction information?" (S406), the user determines whether or not to select "learn" (S407). In a case of Yes in S407, the learning unit 120 updates the learned model by performing the additional learning. In a case of No in S407, the learning unit 120 ends the processing without performing the additional learning.

In the processing illustrated in FIG. 19, when the instruction for selecting the correction information different from the recommended correction information is given after the recommended correction information is modified, and the print target image corrected by the modified correction information is printed (Yes in S405), the presenting unit 130 displays a screen for receiving the user input related to the appropriateness of the modification of the recommended correction information (S406). In addition, when the user input indicating that the modification of the recommended correction information is inappropriate is performed based on the display of the screen by the presenting unit 130 (No in S407), the learning unit 120 skips the machine learning based on the data set in which the print target image is associated with the modified correction information.

The processing illustrated in FIG. 17 has an advantage that the burden on the user can be reduced because the learning device 100 can automatically determine whether or not to perform the additional learning. The processing illustrated in FIG. 18 has an advantage that the learning that reflects the preference of the user for the printing result is possible because the user determines whether or not to perform the additional learning. In contrast, the processing illustrated in FIG. 19 can be performed in a balanced manner by combining FIGS. 17 and 18. In other words, in a situation where the user has not modified the correction information and the necessity for the additional learning is relatively low, the burden on the user is reduced by automatically skipping the additional learning. In addition, in a situation where the user has modified the correction information and the necessity for the additional learning is relatively high, it becomes possible to appropriately determine the appropriateness of the additional learning by entrusting the user with the determination. For example, a case where the user has modified the recommended correction information but notices that the modification is inappropriate based on the actual printing result, can be considered. In this case, it becomes possible to exclude the modified correction information from the additional learning target by performing the processing illustrated in FIG. 19.

As described above, the learning device according to the embodiment includes: the acquiring unit that acquires the image and the correction information designated for printing the image; and the learning unit that performs the machine learning on the recommended correction information recommended for correction on the print target image based on the data set in which the image is associated with the correction information.

According to the method according to the embodiment, as the machine learning using the image and the correction information designated in the image printing is performed, it becomes possible to appropriately learn the condition of the correction information recommended when printing the given image. By performing the processing based on the learning result, the correction information suitable for the image can be automatically set, and thus, the burden on the user can be reduced.

The learning device according to embodiment may further include the processing unit that outputs the recommended correction information corresponding to the print target image based on the learned model generated by the machine learning of the learning unit and performs the correction processing based on the recommended correction information.

In this manner, it becomes possible to execute the output processing of the recommended correction information based on the learning result, and the correction processing based on the recommended correction information, in the learning device.

Further, the learning device according to the embodiment may include the presenting unit that presents the user with the plurality of sample images obtained by performing correction based on the different pieces of the correction information on the given original sample image. The learning unit performs the machine learning based on the data set in which the correction information corresponding to the sample image selected from the plurality of sample images is associated with the original sample image, and accordingly, the parameters to be learned by the learning unit are set.

In this manner, it becomes possible to provide a user interface suitable for acquiring the data set used for learning.

The presenting unit according to the embodiment may present the plurality of the sample images obtained by performing correction based on the different pieces of the correction information on the first original sample image, and presents the plurality of the sample images corrected based on the different pieces of the correction information on the second original sample image of the type different from the first original sample image.

In this manner, it becomes possible to provide a user interface suitable for acquiring various data set.

Further, the learning device according to the embodiment may include the presenting unit that presents the user with the original sample image. The acquiring unit acquires the correction information input by the user based on the presented original sample image. The learning unit performs the machine learning based on the data set in which the original sample image is associated with the correction information, and accordingly, the parameters to be learned by the learning unit are set.

In this manner, it becomes possible to provide a user interface suitable for acquiring the data set used for learning.

In addition, the learning device according to the embodiment may include the presenting unit that presents the print target image after the correction processing based on the recommended correction information is performed by the processing unit. When the recommended correction information is modified based on the print target image presented by the presenting unit and the instruction for selecting the correction information different from the recommended correction information is given, the learning unit performs the machine learning based on the data set in which the print target image before the correction processing is associated with the modified correction information.

In this manner, it becomes possible to execute the additional learning processing when the recommended correction information presented based on the existing learning result is not appropriate.

When the instruction for selecting the correction information different from the recommended correction information is given after the recommended correction information is modified, and the print target image corrected by the modified correction information is printed, the presenting unit according to the embodiment may display the screen for receiving the user input related to the appropriateness of the modification of the recommended correction information. When the user input indicating that the modification of the recommended correction information is inappropriate is performed based on the display of the screen by the presenting unit, the learning unit skips the machine learning based on the data set in which the print target image is associated with the modified correction information.

In this manner, it becomes possible to appropriately determine whether or not to execute the additional learning processing.

Further, the learning unit according to the embodiment may perform the machine learning of the recommended correction information based on the data set in which the image is associated with the correction information and the print output destination information.

In this manner, it becomes possible to learn about the print output destination in addition to the image and the correction information.

Further, the correction information according to the embodiment may include the color density.

In this manner, it becomes possible to appropriately perform color correction in printing.

Further, the learning unit according to the embodiment may generate the learned model by the machine learning. In the learned model, the input layer, the intermediate layer, and the output layer are provided, and the weighting coefficients between the input layer and the intermediate layer and between the intermediate layer and the output layer are set based on the data set in which the image is associated with the correction information designated for printing the image. The learned model causes the computer to function so as to input the data about the print target image to the input layer, perform the arithmetic operation based on the set weighting coefficients, and output data that indicates the recommended correction information from the output layer.

In this manner, it becomes possible to generate the learned model that outputs appropriate correction information by learning the weighting coefficient through the learning processing.

The print control device according to the embodiment is a print control device that controls the printing of the printing apparatus, and includes the storage unit, the receiving unit, and the processing unit. The storage unit stores the learned model that has performed the machine learning with respect to the recommended correction information recommended for the correction of the print target image based on the data set in which the image is associated with the correction information designated for printing the image. The receiving unit receives the input of the print target image. The processing unit determines the recommended correction information corresponding to the input print target image based on the learned model.

In this manner, it becomes possible to appropriately determine the recommended correction information for printing the given print target image based on the learned model which is the result of the machine learning. In addition, as the print control device determines the recommended correction information, it is possible to smoothly execute the correction processing for the print target image and the printing processing when the print instruction is given.

The learned model according to the embodiment is a learned model for determining correction settings for the print target image based on the input print target image. In the learned model, the input layer, the intermediate layer, and the output layer are provided, and the weighting coefficients between the input layer and the intermediate layer and between the intermediate layer and the output layer are set based on the data set in which the image is associated with the correction information designated for printing the image. In addition, the learned model causes the computer to function so as to input the input data about the print target image to the input layer, perform the arithmetic operation based on the set weighting coefficients, and output the data that indicates the recommended correction information recommended for correcting the print target image from the output layer.

Although the embodiment has been described in detail as described above, a person skilled in the art can easily understand that many modifications that do not substantially depart from the novel matters and effects of the embodiment are possible. Therefore, all such modifications are intended to be included within the scope of the disclosure. For example, a term described at least once together with a different term having a broader meaning or the same meaning in the specification or the drawings can be replaced with the different term anywhere in the specification or the drawings. In addition, all combinations of the embodiment and the modification examples are also included in the scope of the disclosure. Further, the configuration and operation of the learning device, the print control device, and the system including the devices are not limited to those described in the embodiment, and various modifications can be made.

What is claimed is:

1. A learning device comprising:
a processor that acquires an image and correction information designated for printing the image,
the processor performing machine learning on recommended correction information recommended for correction on a print target image, based on a data set in which the image is associated with the correction information,
the recommended correction information being a correction parameter for an image correction processing and being different from an image.

2. The learning device according to claim 1, wherein the processor outputs the recommended correction information corresponding to the print target image, based on a learned model generated by the machine learning of the processor, and performs the image correction processing based on the recommended correction information.

3. The learning device according to claim 1, further comprising:
a presenting unit that presents a user with a plurality of sample images obtained by performing correction based on different pieces of correction information on a given original sample image, wherein
the processor sets a parameter to be learned by the processor by performing machine learning based on a data set in which the correction information corresponding to the sample image selected from the plurality of sample images is associated with the original sample image.

4. The learning device according to claim 3, wherein the presenting unit presents a plurality of sample images obtained by performing correction based on different pieces of correction information on a first original sample image, and presents a plurality of sample images obtained by performing correction based on different pieces of correction information on a second original sample image of a type different from the first original sample image.

5. The learning device according to claim 1, further comprising:
a presenting unit that presents a user with an original sample image, wherein
the processor acquires the correction information input by the user based on the original sample image presented, and
the processor sets a parameter to be learned by the processor by performing machine learning based on a data set in which the original sample image is associated with the correction information input by the user.

6. The learning device according to claim 2, further comprising:
a presenting unit that presents the print target image after the image correction processing based on the recommended correction information is performed by the processor, wherein
the processor performs machine learning based on a data set in which the print target image before the image correction processing is associated with modified correction information when the recommended correction information is modified and an instruction to select the correction information different from the recommended correction information is given based on the print target image presented by the presenting unit.

7. The learning device according to claim 6, wherein the presenting unit displays a screen for receiving a user input related to appropriateness of modification with respect to the recommended correction information when the recommended correction information is modified, an instruction to select the correction information different from the recommended correction information is given, and the print target image corrected by the modified correction information is printed, and
the processor skips machine learning based on the data set in which the print target image is associated with the modified correction information when a user input indicating that the modification with respect to the recommended correction information is inappropriate is given, based on a display of the screen by the presenting unit.

8. The learning device according to claim 1, wherein the processor performs machine learning on the recommended correction information based on a data set in which the image is associated with the correction information and print output destination information that indicates a print output destination.

9. The learning device according to claim 1, wherein the correction information includes a color density.

10. The learning device according to claim 1, wherein
the processor generates a learned model by the machine learning,
the learned model has an input layer, an intermediate layer, and an output layer,
weighting coefficients between the input layer and the intermediate layer and between the intermediate layer and the output layer are set in the learned model based on a data set in which the image is associated with the correction information designated for printing the image, and
the learned model causes a computer to input, to the input layer, data about the print target image, perform an arithmetic operation based on the weighting coefficients being set, and output, from the output layer, data that indicates the recommended correction information.

11. A print control device for controlling printing of a printing apparatus, the print control device comprising:
a memory that stores a learned model obtained by performing machine learning on recommended correction information recommended for correction on a print target image, based on a data set in which an image is associated with correction information designated for printing the image;
a processor that receives an input of the print target image,
the processor determining, based on the learned model, the recommended correction information corresponding to the input print target image,
the recommended correction information being a correction parameter for an image correction processing and being different from an image.

12. A non-transitory computer readable medium storing a learned model that causes a computer to determine, based on an input print target image, correction setting of the input print target image, the learned model comprising:
an input layer, an intermediate layer, and an output layer, wherein
weighting coefficients between the input layer and the intermediate layer and between the intermediate layer and the output layer are set based on a data set in which an image is associated with correction information designated for printing the image,
the learned model causes the computer to input, to the input layer, data about the input print target image, perform an arithmetic operation based on the weighting coefficients being set, and output, from the output layer, data that indicates recommended correction information recommended for correction on the print target image, and
the recommended correction information is a correction parameter for an image correction processing and is different from an image.

* * * * *